United States Patent
Zhang et al.

(10) Patent No.: US 11,943,027 B2
(45) Date of Patent: Mar. 26, 2024

(54) CHANNEL STATE INFORMATION TRANSMISSION METHOD AND APPARATUS

(71) Applicant: HUAWEI TECHNOLOGIES CO., LTD., Shenzhen (CN)

(72) Inventors: Di Zhang, Shenzhen (CN); Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 17/371,425

(22) Filed: Jul. 9, 2021

(65) Prior Publication Data
US 2021/0351825 A1 Nov. 11, 2021

Related U.S. Application Data

(63) Continuation of application No. PCT/CN2020/070813, filed on Jan. 8, 2020.

(30) Foreign Application Priority Data

Jan. 10, 2019 (CN) .......................... 201910024776.X

(51) Int. Cl.
*H04B 7/06* (2006.01)
*H04B 17/309* (2015.01)

(52) U.S. Cl.
CPC ......... *H04B 7/0626* (2013.01); *H04B 17/309* (2015.01)

(58) Field of Classification Search
CPC .. H04B 7/0626; H04B 17/309; H04B 17/345; H04B 17/336; H04B 17/382;
(Continued)

(56) References Cited

U.S. PATENT DOCUMENTS

| 2013/0343299 | A1* | 12/2013 | Sayana ............... | H04B 7/0417 370/328 |
|---|---|---|---|---|
| 2017/0070903 | A1 | 3/2017 | Yamada et al. | |
| 2018/0145735 | A1* | 5/2018 | Chen .................... | H04B 7/0486 |

FOREIGN PATENT DOCUMENTS

| CN | 107888252 A | 4/2018 | |
|---|---|---|---|
| CN | 108540178 A | * 9/2018 | ........... H04B 7/0408 |
| CN | 108540178 A | 9/2018 | |
| CN | 109005548 A | 12/2018 | |

(Continued)

OTHER PUBLICATIONS

Catt, "General CSI framework for CSI acquisition and beam management", 3GPP TSG RAN WG1 Meeting 90bis, Prague, CZ, Oct. 9-13, 2017, R1-1717814; 6 pages.

(Continued)

*Primary Examiner* — Vinncelas Louis
(74) *Attorney, Agent, or Firm* — Maier & Maier, PLLC

(57) ABSTRACT

A channel state information transmission method and apparatus. The method includes: receiving N reference signal groups, where N is an integer greater than or equal to 2; and sending channel state information, where the channel state information includes a first resource index, a second resource index, and first channel quality information, the first resource index is a resource index of a first reference signal, the second resource index is a resource index of a second reference signal, the first reference signal and the second reference signal are reference signals in different groups in the N reference signal groups.

10 Claims, 8 Drawing Sheets

(58) Field of Classification Search
CPC ... H04B 7/0417; H04B 7/0486; H04L 5/0023; H04L 5/005; H04L 5/0053; H04L 5/0057; H04L 5/0062; H04L 5/0094; H04L 5/0048; H04W 72/23
See application file for complete search history.

(56) References Cited

FOREIGN PATENT DOCUMENTS

| | | |
|---|---|---|
| KR | 10-2018-0020719 A | 2/2018 |
| WO | 2018137703 A1 | 8/2018 |

OTHER PUBLICATIONS

Huawei, HiSilicon, "Summary of remaining issues for CSI reporting", 3GPP TSG RAN WG 1 Ad Hoc Meeting, Vancouver, Canada, Jan. 22-26, 2018, R1-1800095; 8 pages.

Huawei, HiSilicon, "Remaining issues for CSI framework"; 3GPP TSG RAN WG 1 Ad Hoc Meeting, Vancouver, Canada, Jan. 22-26, 2018, R1-1800529; 6 pages.

3GPP. "3rd Generation Partnership Project; Technical Specification Group Radio Access Network; NR; Radio Resource Control (RRC) protocol specification (Release 15)." 3GPP TS 38.331 V15.3.0 (Sep. 2018). 445 pages.

3GPP. "3rd Generation Partnership Project; Technical Specification Group Radio Access Network; NR; Physical layer procedures for data (Release 15)." 3GPP TS 38.214 V15.3.0 (Sep. 2018). 96 pages.

3GPP. "3rd Generation Partnership Project; Technical Specification Group Radio Access Network; NR; Physical layer measurements (Release 15)." 3GPP TS 38.215 V15.3.0 (Sep. 2018). 15 pages.

* cited by examiner

CHANNEL STATE INFORMATION TRANSMISSION METHOD AND APPARATUS

CROSS-REFERENCE TO RELATED APPLICATIONS

This application is a continuation of International Application No. PCT/CN2020/070813, filed on Jan. 8, 2020, which claims priority to Chinese Patent Application No. 201910024776.X, filed on Jan. 10, 2019, The disclosures of the aforementioned applications are hereby incorporated by reference in their entireties.

TECHNICAL FIELD

The embodiments relate to the communications field, and more specifically, to a channel state information transmission method and apparatus.

BACKGROUND

In a conventional solution, in a beam training process, a channel state of each of a plurality of beams needs to be measured, and information about a beam with relatively good channel quality is reported to a network device.

To obtain the channel state of each beam, the network device needs to configure, for each beam, a resource used for channel measurement, and further needs to configure an interference resource corresponding to channel measurement. Resource overheads of the network device are relatively large, and computational complexity is relatively high. In addition, because the network device cannot learn of a receiving status of a terminal device when configuring the interference resource, the network device configures a non-interference beam as the interference resource, and consequently, channel state information reported by the terminal device is inaccurate.

SUMMARY

The embodiments provide a channel state information transmission method and apparatus, so that accuracy of channel state information reported by a terminal device can be improved.

According to a first aspect, a channel state information transmission method is provided, including: receiving N reference signal groups, where N is an integer greater than or equal to 2; and sending channel state information, where the channel state information includes a first resource index, a second resource index, and first channel quality information, the first resource index is a resource index of a first reference signal, the second resource index is a resource index of a second reference signal, the first reference signal and the second reference signal are reference signals in different groups in the N reference signal groups, and the first channel quality information is obtained by using the first reference signal as a signal and the second reference signal as interference.

In this embodiment, a terminal device may determine, based on a receiving status of the N reference signal groups, a reference signal used as a signal item and a reference signal used as an interference item, thereby avoiding a problem that when a network device configures an interference resource, because the network device cannot learn of a receiving status of the terminal device, the network device configures a non-interference beam as the interference resource, and consequently channel state information reported by the terminal device is inaccurate. The terminal device may report a resource index of the reference signal used as the signal item, a resource index of the reference signal used as the interference item, and measured channel quality information, so that accuracy of the channel state information reported by the terminal device can be improved.

Optionally, the first channel quality information may be a signal to interference plus noise ratio (SINR) (such as an L1-SINR), a channel quality indicator (CQI), reference signal received quality ( ), a signal-to-noise ratio (SNR), or other information that may indicate a channel state/channel quality.

In a possible implementation, the first reference signal and the second reference signal are reference signals simultaneously received by the terminal device.

In other words, in this embodiment, the terminal device can determine the reference signal used as the signal item and the reference signal used as the interference item that are simultaneously received. When reporting the channel state information to the network device, the terminal device may report the resource index of the reference signal used as the signal item, the resource index of the reference signal used as the interference item, and the measured first channel quality information.

In a possible implementation, the second resource index may be resource indexes of one or more reference signals used as interference items.

In a possible implementation, the reported channel state information may include one first resource index, one second resource index, and the first channel quality information; or the reported channel state information may include one first resource index, two second resource indexes, and the first channel quality information. The first resource index may be a resource index of a first reference signal used as a signal, and the second index may be a resource index of a second reference signal used as interference.

In a possible implementation, a quantity of first resource indexes and a quantity of second resource indexes may be configured by the network device, or may be predefined in a protocol, or may be reported by the terminal device.

In a possible implementation, the method further includes: the terminal device determines first reference signals in the N reference signal groups, and the terminal device determines second reference signals in the N reference signal groups based on the first reference signals.

In this embodiment, the terminal device may receive the N reference signal groups, the terminal device determines a first reference signal that is in one of the N reference signal groups and that is used as a signal item, and the terminal device may determine, based on the first reference signal, a second reference signal that is in the N reference signal groups and that is used as an interference item. The first reference signal and the second reference signal may be reference signals in different reference signal groups in the N reference signal groups.

In a possible implementation, the method further includes: the terminal device receives first configuration information, where the first configuration information indicates that the N reference signal groups are channel measurement reference signal groups; and the terminal device sends second channel quality information, where the second channel quality information is obtained by using the second reference signal as a signal and the first reference information as interference.

For example, when all N resource sets configured by the network device are CMRs, in other words, all the N reference signal groups received by the terminal device are reference signal groups used for channel measurement, the terminal device further sends the second channel quality information to the network device, where the second channel quality information is channel quality measured by using the second reference signal as a signal item and the first reference signal as an interference item for the second reference signal.

Optionally, when the network device configures the N reference signal groups as channel measurement reference signal groups, the N reference signal groups may belong to a same resource configuration.

Optionally, when the network device configures the N reference signal groups as channel measurement reference signal groups, the N reference signal groups may belong to different resource configurations.

In a possible implementation, the method further includes: the terminal device sends first identifier information and/or second identifier information, where the first identifier information is used to indicate an identifier of a reference signal group in which the first reference signal is located, and the second identifier information is used to indicate an identifier of a reference signal group in which the second reference signal is located.

For example, when all the N resource sets are CMRs, the first resource index and the second resource index that are reported by the terminal device may be from different resource sets, and the UE may further report an ID of a corresponding resource set in which the first resource index is located and/or an ID of a corresponding resource set in which the second resource index is located.

In a possible implementation, the method further includes: the terminal device receives second configuration information, where the second configuration information indicates that the N reference signal groups include M channel measurement reference signal groups and N-M interference measurement reference signal groups, M is a positive integer less than N, and M may be equal to 1; the terminal device determines the first reference signal in the M reference signal groups; and the terminal device determines the second reference signal in the N-M reference signal groups based on the first reference signal.

In this embodiment, based on a resource configuration sent by the network device, the N reference signal resource sets may include M resource sets used for channel measurement and N-M resource sets used for interference measurement. The terminal device selects a first reference signal used as a signal item from one resource set in the M resource sets, and selects one or more second reference signals that are received simultaneously with the first reference signal and that are used as interference items from one resource set or different resource sets in the N-M resource sets. The terminal device may select, based on the reference signal used as the signal item, the reference signal used as the interference item, to avoid a problem that the channel state information reported by the terminal device is inaccurate because the network device configures a non-interference beam as an interference resource, so that accuracy of the channel state information reported by the terminal device is improved.

In a possible implementation, the method further includes: the terminal device sends third identifier information, where the third identifier information is used to indicate an identifier of a reference signal group in which the second reference signal is located. In other words, when the N resource sets include an IMR, the second resource index reported by the UE may be from different RS sets. In this case, the UE further needs to report an ID of a corresponding set in which the second resource index is located.

According to a second aspect, a channel state information transmission method is provided, including: a terminal device receives X reference signals; the terminal device sends third channel quality information of Y reference signals in the X reference signals, where X and Y are positive integers, and Y is less than or equal to X; and the terminal device sends fourth channel quality information of P reference signals, where the fourth channel quality information of the P reference signals is obtained based on the third channel quality information of the Y reference signals, and P is a positive integer.

In this embodiment, the terminal device may receive the X reference signals, select Y better reference signals by measuring third channel quality information of the X reference signals and report the Y better reference signals to a network device, and then report the fourth channel quality information of the P reference signals based on the third channel quality information of the Y reference signals, to determine a better reference signal. In this embodiment, resource overheads can be effectively reduced, reporting overheads can be reduced, and computational complexity can be reduced.

Optionally, resource configurations of the X reference signals may be from configuration performed on the terminal device by one network device or a plurality of network devices.

In a possible implementation, the method further includes: the terminal device receives first report configuration information, where the first report configuration information indicates a first resource configuration and a first report quantity, the first resource configuration indicates resources of the X reference signals, and the first report quantity indicates a type of the third channel quality information.

For example, before the terminal device receives the X reference signals, the method further includes: the terminal device receives the first report configuration information, receives the X reference signals based on the first report configuration information, detects L1-RSRP of the X reference signals to determine Y reference signals with relatively good L1-RSRP, and sends the L1-RSRP of the Y reference signals to the network device.

In a possible implementation, the method further includes: the terminal device receives second report configuration information, where the second report configuration information indicates a second resource configuration and a second report quantity, the second resource configuration indicates resources of L reference signals and resources of Q third reference signals, the L reference signals are reference signals used for channel measurement, the third reference signals are reference signals used for interference measurement, the second report quantity indicates a type of the fourth channel quality information, the P reference signals are a subset of the L reference signals, and L and Q are positive integers.

For example, after the terminal device sends the third channel quality information of the Y reference signals in the X reference signals, the method further includes: the terminal device receives the second report configuration information, and the terminal device sends the fourth channel quality information of the P reference signals to the network device based on a second report configuration.

Optionally, the fourth channel quality information is any one of the following: a SINR, a SNR, a CQI, and RSRQ.

Optionally, an intersection set of the L reference signals and the Y reference signals is a non-empty subset, and the P reference signals are a subset of the L reference signals.

For example, in a beam training process, X=64, Y=8, L=4, and P=2. In other words, the terminal device may receive 64 reference signals based on a resource configuration, and the terminal device may determine eight reference signals with relatively good RSRP from the 64 reference signals. Resources of four reference signals may be configured in the second configuration information received by the terminal device, in other words, channel quality information of the four reference signals may be measured, and a signal to interference plus noise ratio, a signal-to-noise ratio SR, a channel quality indicator, reference signal received quality SRQ, or the like may be measured. The terminal device may send two best reference signals to the network device based on a measurement result.

In a possible implementation, the P reference signals are a subset of the Y reference signals.

In a possible implementation, the method further includes: the terminal device receives the Q third reference signals.

Optionally, a reference signal CMR that is in the second report configuration and that is used for channel measurement may be indicated but not sent. In other words, after the second report configuration information is received, it may indicate that a reference signal in a CMR resource set does not need to be sent again. A reference signal IMR used for interference measurement may be sent, in other words, the terminal device may receive the Q third reference signals that are used for interference measurement and that are indicated in the second report configuration.

In a possible implementation, the second report configuration information may indicate resource configurations of the Q third reference signals. In other words, the Y reference signals reported by the terminal device may be used as signal item reference signals, and the network device may send the second report configuration information to the terminal device. The second report configuration information indicates a second resource configuration, and the second resource configuration may indicate the resource configurations of the Q third reference signals that are used as interference items for the Y signal items.

In a possible implementation, the second report configuration information and the first report configuration information meet a first association relationship, and/or the second resource configuration and the first resource configuration meet a second association relationship.

Optionally, the second report configuration information and the first report configuration information meet the first association relationship, and the first association relationship is used to indicate that the fourth channel quality information of the P reference signals is sent based on the third channel quality information of the Y reference signals. Alternatively, the second resource configuration and the first resource configuration meet the second association relationship, and the second association relationship is used to indicate that the fourth channel quality information of the P reference signals is sent based on the third channel quality information of the Y reference signals.

Optionally, the second report configuration information and the first report configuration information meet the first association relationship, and the second resource configuration and the first resource configuration meet the second association relationship. The first association relationship is used to indicate that the fourth channel quality information of the P reference signals is sent based on the third channel quality information of the Y reference signals, and the second association relationship is used to indicate that the fourth channel quality information of the P reference signals is sent based on the third channel quality information of the Y reference signals.

Optionally, that the terminal device sends the fourth channel quality information of the P reference signals includes:

the terminal device sends the fourth channel quality information of the P reference signals based on the second report configuration information and the first association relationship or the second association relationship.

In a possible implementation, the first association relationship is that the second report configuration information includes identification information indicating the first report configuration information.

For example, the second report configuration information may include the identification information indicating the first report configuration information.

For example, the identification information in the second report configuration information may indicate a first report configuration index (report config ID).

For example, the identification information in the second report configuration information may indicate a first resource configuration index (resource config ID).

In a possible implementation, the second association relationship is one of the following relationships: a transmission time interval between the L reference signals and/or the Q third reference signals and the X reference signals is less than a preset threshold; the L reference signals and/or the Q third reference signals and the X reference signals meet a QCL relationship; or the resources of the L reference signals and/or the resources of the Q third reference signals are subsets of the resources of the X reference signals.

Optionally, that one or more of the L reference signals and one or more of the X reference signals meet the QCL relationship may be predefined or may be indicated by using signaling (for example, one of RRC signaling, MAC CE signaling, and DCI signaling).

For example, that one of the L reference signals and one of the X reference signals meet the QCL relationship may be predefined; or that one of the L reference signals and a plurality of reference signals in the X reference signals meet the QCL relationship may be predefined. For example, it is assumed that the L reference signals are four reference signals, the X reference signals are four reference signals, and that a first reference signal in the L reference signals and a first reference signal in the X reference signals meet the QCL relationship is predefined, or that a first reference signal in the L reference signals and a first reference signal and a second reference signal in the X reference signals meet the QCL relationship is predefined.

Optionally, that one or more of the Q third reference signals and one or more of the X reference signals meet the QCL relationship may be predefined or may be indicated by using signaling (for example, one of RRC signaling, MAC CE signaling, and DCI signaling).

For example, that one of the Q third reference signals and one of the X reference signals meet the QCL relationship may be predefined; or that one of the Q third reference signals and a plurality of reference signals in the X reference signals meet the QCL relationship may be predefined. For example, it is assumed that the Q third reference signals are four third reference signals, the X reference signals are four reference signals, and that a first third reference signal in the Q third reference signals and a first reference signal in the X reference signals meet the QCL relationship may be predefined, or that a first third reference signal in the Q third reference signals and a first reference signal and a second reference signal in the X reference signals meet the QCL relationship may be predefined.

Optionally, a reference signal that is in the L reference signals and that has a same resource identifier as a reference signal in the X reference signals meets the QCL relationship, and/or a reference signal that is in the Q third reference signals and that has a same resource identifier as a reference signal in the X reference signals meets the QCL relationship.

The QCL relationship may be quasi co-site or quasi co-location assumption information, or may be referred to as co-location assumption information. The QCL information may be used to assist in describing beamforming information and a receiving procedure on a receive side of the terminal device.

For example, the first resource configuration and the second resource configuration meet a first time sequence relationship, for example, a time interval (start time, end time, and the like) of sending or reporting the first resource configuration and the second resource configuration is less than or equal to a first threshold K. The first threshold may be reported based on a capability of the terminal device, or predefined in a protocol, or configured by the network device.

Optionally, the reference signal in the first resource configuration may be a periodic reference signal or a half-periodic reference signal (for example, may be a CSI-RS or an SSB), in other words, the reference signal used for channel measurement may be a periodic reference signal or a half-periodic reference signal.

Optionally, the reference signal in the second resource configuration may be an aperiodic reference signal (for example, may be a CSI-RS), in other words, the reference signal used for interference measurement may be an aperiodic reference signal.

According to a third aspect, a channel state information transmission method is provided, including: a network device sends N reference signal groups, where N is an integer greater than or equal to 2; and the network device receives channel state information, where the channel state information includes a first resource index, a second resource index, and first channel quality information, the first resource index is a resource index of a first reference signal, the second resource index is a resource index of a second reference signal, the first reference signal and the second reference signal are reference signals in different groups in the N reference signal groups, and the first channel quality information is obtained by using the first reference signal as a signal and the second reference signal as interference.

In this embodiment, the network device may receive the first resource index, the second resource index, and the first channel quality information that are sent by a terminal device. The terminal device may determine, based on a receiving status of the N reference signal groups, a reference signal used as a signal item and a reference signal used as an interference item, thereby avoiding a problem that when the network device configures an interference resource, because the network device cannot learn of a receiving status of the terminal device, the network device configures a non-interference beam as the interference resource, and consequently channel state information reported by the terminal device is inaccurate. The terminal device may report a resource index of the reference signal used as the signal item, a resource index of the reference signal used as the interference item, and measured channel quality information, so that accuracy of the channel state information reported by the terminal device can be improved.

In a possible implementation, the method further includes: the network device sends first configuration information, where the first configuration information indicates that the N reference signal groups are channel measurement reference signal groups; and the network device receives second channel quality information, where the second channel quality information is obtained by using the second reference signal as a signal and the first reference information as interference.

In a possible implementation, the method further includes: the network device receives first identifier information and/or second identifier information, where the first identifier information is used to indicate an identifier of a reference signal group in which the first reference signal is located, and the second identifier information is used to indicate an identifier of a reference signal group in which the second reference signal is located.

In a possible implementation, the method further includes: the network device sends second configuration information, where the second configuration information indicates that the N reference signal groups include M channel measurement reference signal groups and N-M interference measurement reference signal groups, and M is a positive integer less than N.

In a possible implementation, the method further includes: the network device receives third identifier information, where the third identifier information is used to indicate an identifier of a reference signal group in which the second reference signal is located.

According to a fourth aspect, a channel state information transmission method is provided, including: a network device sends X reference signals, and the network device receives third channel quality information of Y reference signals in the X reference signals, where X and Y are positive integers, and Y is less than or equal to X; and the network device receives fourth channel quality information of P reference signals, where the fourth channel quality information of the P reference signals is obtained based on the third channel quality information of the Y reference signals, and P is a positive integer.

In this embodiment, the network device may send the X reference signals to a terminal device, and the terminal device selects Y better reference signals by measuring third channel quality information of the X reference signals and report the Y better reference signals to the network device, and then reports the fourth channel quality information of the P reference signals based on the third channel quality information of the Y reference signals, to determine a better reference signal. In this embodiment, resource overheads can be effectively reduced, reporting overheads can be reduced, and computational complexity can be reduced.

In a possible implementation, the method further includes: the network device sends first report configuration information, where the first report configuration information indicates a first resource configuration and a first report quantity, the first resource configuration indicates resources of the X reference signals, and the first report quantity indicates a type of the third channel quality information.

In a possible implementation, the method further includes: the network device sends second report configuration information, where the second report configuration information indicates a second resource configuration and a second report quantity, the second resource configuration indicates resources of L reference signals and resources of Q third reference signals, the L reference signals are reference signals used for channel measurement, the third reference signals are reference signals used for interference measurement, the second report quantity indicates a type of the fourth channel quality information, the P reference signals are a subset of the L reference signals, and L and Q are positive integers.

In a possible implementation, the P reference signals are a subset of the Y reference signals.

In a possible implementation, the method further includes: the network device sends the Q third reference signals.

In a possible implementation, the second report configuration information and the first report configuration information meet a first association relationship, and/or the second resource configuration and the first resource configuration meet a second association relationship.

Optionally, the second report configuration information and the first report configuration information meet the first association relationship, and the first association relationship is used to indicate that the fourth channel quality information of the P reference signals is sent based on the third channel quality information of the Y reference signals. Alternatively, the second resource configuration and the first resource configuration meet the second association relationship, and the second association relationship is used to indicate that the fourth channel quality information of the P reference signals is sent based on the third channel quality information of the Y reference signals.

Optionally, the second report configuration information and the first report configuration information meet the first association relationship, and the second resource configuration and the first resource configuration meet the second association relationship. The first association relationship is used to indicate that the fourth channel quality information of the P reference signals is sent based on the third channel quality information of the Y reference signals, and the second association relationship is used to indicate that the fourth channel quality information of the P reference signals is sent based on the third channel quality information of the Y reference signals.

In a possible implementation, the first association relationship is that the second report configuration information includes identification information indicating the first report configuration information.

For example, the second report configuration information may include the identification information indicating the first report configuration information.

For example, the identification information in the second report configuration information may indicate a first report configuration index (report config ID).

For example, the identification information in the second report configuration information may indicate a first resource configuration index (resource config ID).

In a possible implementation, the second association relationship is one of the following relationships: a transmission time interval between the L reference signals and/or the Q third reference signals and the X reference signals is less than a preset threshold; the L reference signals and/or the Q third reference signals and the X reference signals meet a QCL relationship; or the resources of the L reference signals and/or the resources of the Q third reference signals are subsets of the resources of the X reference signals.

For example, the first resource configuration and the second resource configuration meet a first time sequence relationship, for example, a time interval (start time, end time, and the like) of sending or reporting the first resource configuration and the second resource configuration is less than or equal to a first threshold K. The first threshold may be reported based on a capability of the UE, or predefined in a protocol, or configured by the network device.

Optionally, the reference signal in the first resource configuration may be a periodic reference signal or a half-periodic reference signal (for example, may be a CSI-RS or an SSB), in other words, the reference signal used for channel measurement may be a periodic reference signal or a half-periodic reference signal.

Optionally, the reference signal in the second resource configuration may be an aperiodic reference signal (for example, may be a CSI-RS), in other words, the reference signal used for interference measurement may be an aperiodic reference signal.

According to a fifth aspect, a channel state information transmission apparatus is provided, and the apparatus includes units configured to perform steps in the method in the first aspect or any possible implementation of the first aspect, or includes units configured to perform steps in the method in the second aspect or any possible implementation of the second aspect.

According to a sixth aspect, a channel state information transmission apparatus is provided, and the apparatus includes units configured to perform steps in the method in the third aspect or any possible implementation of the third aspect, or includes units configured to perform steps in the method in the fourth aspect or any possible implementation of the fourth aspect.

According to a seventh aspect, a channel state information transmission apparatus is provided and includes a processor. The processor is coupled to a memory, and may be configured to execute instructions in the memory, to implement the method in any one of the foregoing aspects and any possible implementation of any aspect. Optionally, the apparatus further includes the memory. Optionally, the apparatus further includes a communications interface, and the processor is coupled to the communications interface.

In an implementation, the apparatus is a terminal device. When the apparatus is a terminal device, the communications interface may be a transceiver or an input/output interface.

In another implementation, the apparatus is a chip configured in a terminal device. When the apparatus is a chip configured in a terminal device, the communications interface may be an input/output interface of the chip.

Optionally, the transceiver may be a transceiver circuit. Optionally, the input/output interface may be an input/output circuit.

In an implementation, the apparatus is a network device. When the apparatus is a network device, the communications interface may be a transceiver or an input/output interface.

In another implementation, the apparatus is a chip configured in a network device. When the apparatus is a chip configured in a network device, the communications interface may be an input/output interface of the chip.

Optionally, the transceiver may be a transceiver circuit. Optionally, the input/output interface may be an input/output circuit.

It may be understood that the apparatus may be alternatively the terminal device in any one of the foregoing implementations, to implement steps or functions of the terminal device in any one of the foregoing implementations.

In another implementation, the apparatus may be alternatively the network device in any one of the foregoing implementations, to implement steps or functions of the network device in any one of the foregoing implementations.

For example, the apparatus may include a receiving unit and a sending unit. For example, the sending unit may be a transmitter, and the receiving unit may be a receiver. The apparatus may further include a processing unit, and the processing unit may be a processor. The apparatus may further include a storage unit, and the storage unit may be a memory. The storage unit is configured to store instructions, and the processing unit executes the instructions stored in the storage unit, so that the apparatus performs the method in any one of the foregoing aspects and one of the optional implementations thereof. When the chip is a chip in the apparatus, the processing unit may be a processor, and the receiving unit/sending unit may be an input/output interface, a pin, a circuit, or the like. The processing unit executes the instructions stored in the storage unit, so that the apparatus performs the method in any one of the foregoing aspects and one of the optional implementations thereof. The storage unit may be a storage unit (for example, a register or a cache) in the chip, or may be a storage unit (for example, a read-only memory or a random access memory) located outside the chip in the apparatus.

According to an eighth aspect, a processor is provided and includes an input circuit, an output circuit, and a processing circuit. The processing circuit is configured to receive a signal by using the input circuit, and transmit a signal by using the output circuit, so that the processor performs the method in any aspect and any possible implementation of any aspect.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be, by way of example instead of limitation, received and input by the receiver. A signal output by the output circuit may be, by way of example instead of limitation, output to a transmitter and transmitted by the transmitter, and the input circuit and the output circuit may be a same circuit. The circuit is separately used as an input circuit and an output circuit at different moments. An implementation of the processor and various circuits is not limited in this embodiment.

According to a ninth aspect, a processing apparatus is provided and includes a processor and a memory. The processor is configured to read instructions stored in the memory, and may receive a signal by using a receiver, and transmit a signal by using a transmitter, to perform the method in any aspect and any possible implementation of the first aspect.

Optionally, there are one or more processors, and there are one or more memories.

Optionally, the memory may be integrated with the processor, or the memory is disposed separately from the processor.

In an implementation process, the memory may be a non-transitory memory, for example, a read only memory (ROM), and the memory and the processor may be integrated on a same chip, or may be separately disposed on different chips. A type of the memory and a manner of disposing the memory and the processor are not limited in this embodiment.

It should be understood that a related data interaction process such as sending N reference signal groups may be a process of outputting the N reference signal groups from the processor, and receiving the N reference signal groups may be a process in which the processor receives the N reference signal groups. For example, data output by the processor may be output to the transmitter, and input data received by the processor may be from the receiver. The transmitter and the receiver may be collectively referred to as a transceiver.

The processing apparatus in the ninth aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, and may be located outside the processor and exist independently.

According to a tenth aspect, a computer program product is provided, where the computer program product includes a computer program (which may also be referred to as code or instructions), and when the computer program is run, a computer is enabled to perform the method in any one of the foregoing aspects and any possible implementation of any aspect.

According to an eleventh aspect, a computer-readable medium is provided, where the computer-readable medium stores a computer program (which may also be referred to as code or instructions), and when the computer program is run on a computer, the computer is enabled to perform the method in any one of the foregoing aspects and any possible implementation of any aspect.

DETAILED DESCRIPTION OF THE EMBODIMENTS

Figure 1:
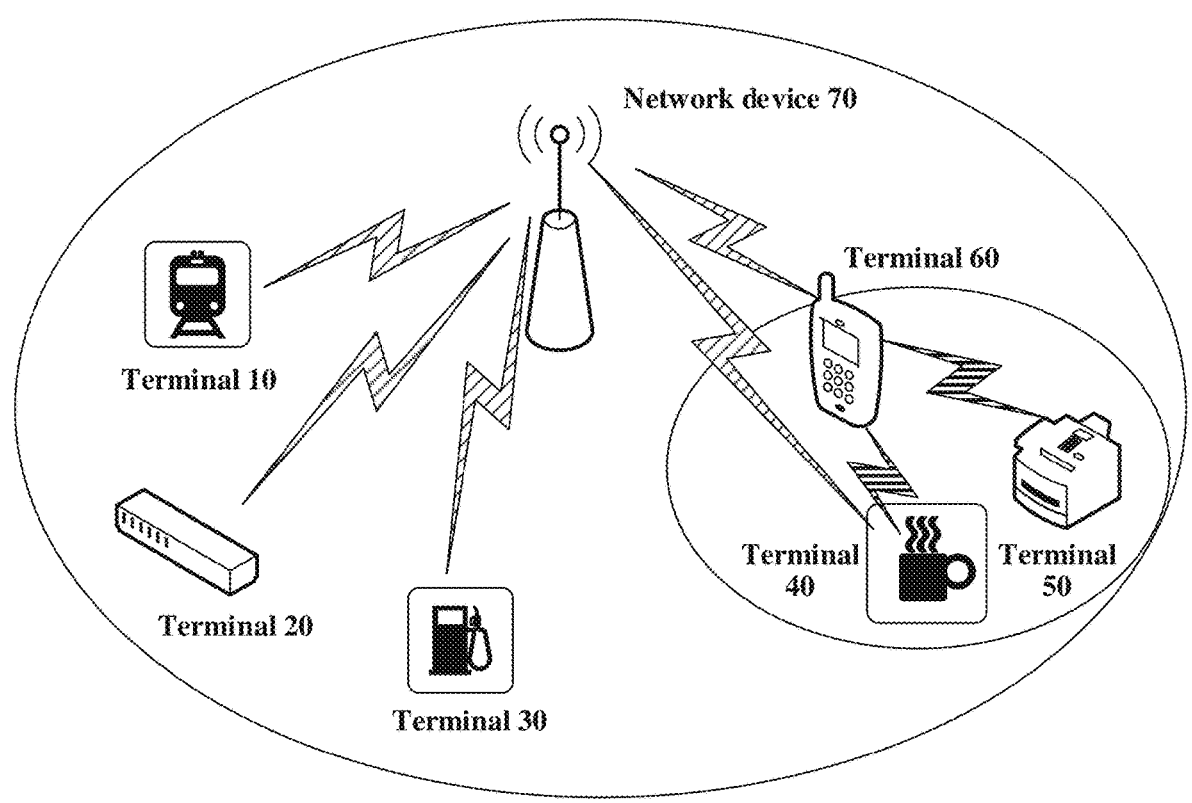
FIG. 1 is a schematic diagram of a communications system according to the embodiments.

The following describes the solutions with reference to the accompanying drawings.

The solutions in embodiments may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments may be as user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), or the like. This is not limited in the embodiments.

The network device in the embodiments may be a device used to communicate with the terminal device. The network device may be a base transceiver station (base transceiver station, BTS) in a global system for mobile communications (global system for mobile communications, GSM) system or a code division multiple access (code division multiple access, CDMA) system, or may be a NodeB (NodeB, NB) in a wideband code division multiple access (wideband code division multiple access, WCDMA) system, or may be an evolved NodeB (evolved NodeB, eNB or eNodeB) in an LTE system, or may be a radio controller in a cloud radio access network (cloud radio access network, CRAN) scenario, or the network device may be a network device such as a relay station, an access point, a vehicle-mounted device, a wearable device, and a network device in a 5G network or a network device in a future evolved PLMN network. This is not limited in the embodiments.

It should be understood that the =solutions provided in the embodiments may be applied to various communications systems, for example, a 5G mobile communications system. The 5G mobile communications system described includes a non-standalone (NSA) 5G mobile communications system and/or a standalone (SA) 5G mobile communications system. The solutions provided may be further applied to a future communications system, such as a sixth-generation mobile communications system.

In the embodiments, the terminal device or the network device includes a hardware layer, an operating system layer that runs above the hardware layer, and an application layer that runs above the operating system layer. The hardware layer includes hardware such as a central processing unit (CPU), a memory management unit (MMU), and a memory (also referred to as a main memory). The operating system may be any one or more computer operating systems that process a service by using a process, for example, a Linux operating system, a Unix operating system, an Android operating system, an iOS operating system, or a windows operating system. The application layer includes applications such as a browser, an address book, word processing software, and instant messaging software. In addition, a specific structure of an entity for performing the method provided in the embodiments is not limited in the embodiments, provided that a program that records code of the method provided in the embodiments can be run to perform communication based on the method provided in the embodiments. For example, the method provided in the embodiments may be performed by the terminal device or the network device, or a function module that is in the terminal device or the network device and that can invoke a program and execute the program.

In addition, aspects or features may be implemented as a method, an apparatus, or a product that uses standard programming and/or engineering technologies. The term "product" covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described may indicate one or more devices and/or other machine-readable media that are configured to store information. The term "machine-readable medium" may include but is not limited to a radio channel and various other media that can store, contain, and/or carry instructions and/or data.

FIG. 1 is a schematic diagram of a communications system according to the embodiments n. The communications system in FIG. 1 may include at least one terminal device (for example, a terminal device 10, a terminal device 20, a terminal device 30, a terminal device a terminal device 50, and a terminal device 60) and a network device 70. The network device 70 is configured to provide a communication service for the terminal device and access a core network. The terminal device may access a network by searching for a synchronization signal, a broadcast signal, and the like that are sent by the network device 70, to communicate with the network. In FIG. 1, the terminal device 10, the terminal device 20, the terminal device the terminal device 40, and the terminal device 60 may perform uplink and downlink transmission with the network device 70. For example, the network device 70 may send a downlink signal to the terminal device 10, the terminal device 20, the terminal device 30, the terminal device 40, and the terminal device 60, and may also receive uplink signals sent by the terminal device 10, the terminal device 20, the terminal device 30, the terminal device 40, and the terminal device 60.

In addition, the terminal device 40, the terminal device 50, and the terminal device 60 may also be considered as a communications system. The terminal device 60 may send a downlink signal to the terminal device 40 and the terminal device 50, and may also receive uplink signals sent by the terminal device 40 and the terminal device 50.

The terminal device 60 and the network device 70 in the figure are used as examples for description.

The network device 70 and the terminal device 60 may use different types of reference signals to complete data transmission, where one type of reference signal is used for channel state measurement or channel quality measurement, so that the network device 70 schedules, based on a current channel state or current channel quality, a transmission resource to be used by the terminal device 60, to transmit data through a channel with relatively good channel quality.

For example, the terminal device 60 may receive a channel state information reference signal (CSI-RS) from the network device 700, and measure channel quality of the CSI-RS, to obtain channel state information ( ).

There are two types of CSI-RS. One is zero power (ZP) CSI-RS that is used for interference measurement. The other is a non-zero power (NZP) CSI-RS that is used for channel state measurement and channel estimation.

In a 5G mobile communications system, the NZP CSI-RS may be further used for interference measurement and layer 1 (L1) reference signal received power (reference signal received power, RSRP) measurement, where L1-RSRP is used to determine an L1 signal to interference plus noise ratio (SINR), so that the network device 70 and the terminal device 60 select a beam of relatively good channel quality from a plurality of beams based on an L1-SINR corresponding to the beam.

The CSI may include at least one of a channel quality indicator (CQI), a precoding matrix indicator (PMI), a CSI-RS resource indicator (CRI), a synchronization signal/physical broadcast channel block (SSB) resource indicator (SSBRI), a layer indicator (layer indicator, LI), a rank indicator (RI), L1-RSRP, and an L1-SINR. The CSI may be sent by the terminal device 60 to the network device 70 through a physical uplink control channel (PUCCH) or a physical uplink shared channel ( ).

The network device 70 may configure at least one type of CSI report configuration for the terminal device 60 by using higher layer signaling (CSI-Report Config), and configure at least one type of CSI-RS resource configuration for the terminal device 60 by using higher layer signaling (CSI-Resource Config). The CSI report configuration is used to indicate a reporting type of the CSI, and the reporting type of the CSI includes periodic reporting, semi-persistent reporting, and aperiodic reporting. The CSI-RS resource configuration is used to indicate a CSI-RS resource. The CSI-RS resource includes a periodic CSI-RS resource, a semi-persistent CSI-RS resource, and an aperiodic CSI-RS resource, and is used by the terminal device 60 to report the CSI. The periodic CSI-RS resource may be used for periodic reporting or semi-persistent reporting or aperiodic reporting, the semi-persistent CSI-RS resource may be used for semi-persistent reporting or aperiodic reporting, and the aperiodic CSI-RS resource can only be used for aperiodic reporting.

An example in which each CSI-RS resource configuration includes only one CSI-RS resource set is used as an example below to describe a CSI-RS resource configuration method.

Configuration Method 1

The network device 70 may configure two resource configurations for the terminal device 60. One resource configuration is used to configure a transmission resource required for channel measurement, such as a first reference signal resource set. For ease of description, a reference signal resource in the first reference signal resource set is referred to as a channel measurement resource (CMR). The CMR may be an SSB resource, or may be an NZP CSI-RS resource. The other resource configuration is used to configure a transmission resource required for interference measurement, such as a second reference signal resource set. For ease of description, a reference signal resource in the second reference signal resource set is referred to as an interference measurement resource (interference measurement resource, IMR). The IMR may be a CSI interference measurement (CSI-IM) resource, or may be an NZP CSI-RS resource.

Configuration Method 2

The network device 70 may configure three resource configurations for the terminal device 60. A first resource configuration is used to configure a CMR, and the CMR may be an SSB resource or an NZP CSI-RS resource. A second resource configuration and a third resource configuration are used to configure an IMR, the second resource configuration is used to configure a CSI-IM resource, and the third resource configuration is used to configure an NZP CSI-RS resource. Optionally, the CSI-IM resource may be used to measure inter-cell interference, and the NZP CSI-RS resource may be used to measure multi-user (MU) interference in a cell, or interference between a plurality of coordination sets (in other words, TRP) during NCJT, or interference between a plurality of beams/transport streams/transport layers in the user.

The terminal device 60 measures a reference signal on the foregoing resource to obtain channel state information.

Configuration Method 3

The network device 70 may configure two resource configurations for the terminal device 60. Both the two resource configurations are used to configure a transmission resource required for channel measurement, such as a first reference signal resource set and a second reference signal resource set. The terminal device 60 measures at least one reference signal in the first reference signal resource set and at least one reference signal in the second reference signal resource set to obtain two pieces of channel state information. When a reference signal carried on a CMR in the first reference signal resource set is used as a non-interference signal, and a reference signal carried on a CMR in the second reference signal resource set is used as an interference signal, one piece of channel state information is measured. When the reference signal carried on the CMR in the first reference signal resource set is used as an interference signal, and the reference signal carried on the CMR in the second reference signal resource set is used as a non-interference signal, the other piece of channel state information is measured.

For a beam training procedure, several preferred beams need to be selected from a plurality of beams. Therefore, a quantity of CMR resources needs to be greater than one. Each CMR resource needs to have a corresponding IMR resource. If the terminal device measures communication quality of the plurality of beams based on the foregoing different configuration methods of the network device, and reports channel state information of the beams to the network device, resource overheads are huge and a measurement process is relatively complex. For each resource used as a signal, the network device may configure a plurality of resources that interfere with the resource. However, when configuring an interference resource, the network device cannot learn whether the terminal device can simultaneously receive a configured resource used as a signal and a configured resource used as interference. If the terminal device cannot simultaneously receive the resource used as a signal and the resource used as interference, the measured channel state information is inaccurate (for example, measured interference is excessively large and channel quality is excessively small).

In view of this, an embodiment provides a channel state information transmission method. In a process of measuring channel state information, a terminal device can determine a reference signal used as a signal and a reference signal used as interference that are simultaneously received, and when reporting the channel state information to a network device, the terminal device may report a resource index of the reference signal used as a signal, a resource index of the reference signal used as interference, and measured channel quality information. In other words, in this embodiment, the terminal device may select, based on a resource configuration of the network device, a resource used as interference, and does not need to measure channel quality based on the configuration of the network device, thereby avoiding measurement of channel quality information between a resource used as a signal and the resource used as interference that cannot be simultaneously received, to recommend a relatively good transmission manner for data transmission, so that the network device obtains accurate channel state information.

It should be noted that one or more pieces of channel state information or beam information (for example, including a resource index and corresponding channel quality information) reported by the terminal device to the network device based on a plurality of reference signals may be selected and reported by the terminal device, may be reported based on an instruction principle of the network device, or may be reported based on a protocol-predefined rule.

For example, the terminal device may report beam/channel state information of relatively good channel quality, or the terminal device may report beam information/channel state information of relatively poor channel quality. This is not limited in the embodiments.

The following describes the embodiments in detail with reference to an example. It should be noted that this is merely to help a person of ordinary skill in the art better understand the embodiments, but does not limit the scope of the embodiments.

It should be understood that, in the embodiments, "first", "second", "third", "fourth", and the like are merely intended to indicate different objects, and do not indicate other limitations on the indicated objects.

For ease of understanding, the following describes items related to the embodiments:

1. Beam:

The beam is a type of communication resource. The beam may be a wide beam, a narrow beam, or another type of beam. A technology of forming the beam may be a beamforming technology or another technical means. The beamforming technology may be a digital beamforming technology, an analog beamforming technology, and a hybrid digital/analog beamforming technology. Different beams may be considered as different resources. Same information or different information may be sent by using different beams. Optionally, a plurality of beams that have a same communication feature or similar communication features may be considered as one beam. One beam may include one or more antenna ports that are configured to transmit a data channel, a control channel, a sounding signal, and the like. For example, a transmit beam may indicate distribution of signal strength formed in different spatial directions after a signal is transmitted through an antenna, and a receive beam may indicate distribution of signal strength, in different spatial directions, of a wireless signal received from the antenna. It may be understood that one or more antenna ports that form one beam may also be considered as one antenna port set.

Beams may be classified into a transmit beam and a receive beam of the network device and a transmit beam and a receive beam of the terminal device. The transmit beam of the network device is used to describe beamforming information on a transmit side of the network device, a receive beam of a base station is used to describe beamforming information on a receive side of the network device, the transmit beam of the terminal device is used to describe beamforming information on a transmit side of the terminal device, and the receive beam of the terminal is used to describe beamforming information on a receive side of the terminal device. In other words, the beam is used to describe beamforming information.

The beam may correspond to a time resource and/or a space resource and/or a frequency domain resource.

Optionally, the beam may further correspond to a reference signal resource (for example, a beamforming reference signal resource) or beamforming information.

Optionally, the beam may further correspond to information associated with a reference signal resource of the network device. A reference signal may be a CSI-RS, an SSB, a DMRS, a phase tracking signal (PTRS), a tracking signal (TRS), or the like, and the information associated with the reference signal resource may be a reference signal resource identifier, QCL information (such as type-D QCL), or the like. The reference signal resource identifier corresponds to a transmit/receive beam pair previously established based on measurement of the reference signal resource. By using this reference signal resource index, the terminal may infer beam information.

Optionally, the beam may further correspond to a spatial domain filter (spatial filter) and a spatial domain transmission filter.

2. Quasi Co-Location (QCL) Information

Quasi co-site/quasi co-location QCL assumption information may also be referred to as co-location assumption information. The QCL information is used to assist in describing beamforming information and a receiving procedure on a receive side of the terminal device.

The QCL information is used to indicate a QCL relationship between two types of reference signals. A target reference signal may be generally a demodulation reference signal (DMRS), a channel state information reference signal (CSI-RS), or the like. A referenced reference signal or a source reference signal may be generally a channel state information reference signal (-RS), a tracking reference signal (TRS), a synchronous signal/broadcast channel block (synchronous signal/PBCH block, SSB), or the like. It should be understood that spatial characteristic parameters of two reference signals or channels that meet the QCL relationship are the same. Therefore, a spatial characteristic parameter of the target reference signal may be inferred based on a resource index of the source reference signal. The spatial characteristic parameter includes one or more of the following parameters:

an angle of incidence (AoA), a dominant angle of incidence AoA, an average angle of incidence, a power angular spectrum (PAS) of an angle of incidence, an angle of departure (AoD), a dominant angle of departure, an average angle of departure, a power angular spectrum of an angle of departure, terminal transmit beamforming, terminal receive beamforming, spatial channel correlation, base station transmit beamforming, base station receive beamforming, an average channel gain, an average channel delay, delay spread, Doppler spread, Doppler frequency shift (Doppler shift), a spatial receive parameter (spatial Rx parameters), and the like.

These spatial characteristic parameters describe a spatial channel characteristic between an antenna port of the source reference signal and an antenna port of the target reference signal, and help the terminal device complete a receive-side beamforming or receive-side processing process based on the QCL information. It should be understood that the terminal may receive the target reference signal based on receive beam information of the source reference signal indicated by the QCL information.

To reduce QCL information indication overheads of a network device side to a terminal device side, in an optional implementation, the network device side may indicate that a demodulation reference signal of a PDCCH or a PDSCH and one or more of a plurality of reference signal resources previously reported by the terminal device meet the QCL relationship. For example, the reference signal may be a channel state information reference signal (CSI-RS). Herein, an index of each reported CSI-RS resource corresponds to one transmit/receive beam pair previously established based on measurement of the CSI-RS resource. It should be understood that receive beam information of two reference signals or channels that meet the QCL relationship is the same, so that the UE may infer receive beam information of the PDCCH or the PDSCH based on the reference signal resource index.

In an existing standard, four types of QCL are defined. The base station may simultaneously configure one or more types of QCL for the UE, such as QCL types A+D and C+D.

QCL types A: Doppler shift, Doppler spread, average delay, delay spread;
QCL types B: Doppler shift, Doppler spread;
QCL types C: average delay, Doppler shift;
QCL types D: Spatial Rx parameter.

Optionally, the QCL relationship in the embodiments may mainly be QCL types D.

It should be understood that spatial characteristic parameters of two reference signals or channels that meet spatial correlation information are the same. Therefore, a spatial characteristic parameter of the target reference signal may be inferred based on the resource index of the source reference signal. The spatial characteristic parameter includes one or more of the following parameters:

an angle of incidence (AoA), a dominant angle of incidence AoA, an average angle of incidence, a power angular spectrum (PAS) of an angle of incidence, an angle of departure (AoD), a dominant angle of departure, an average angle of departure, a power angular spectrum of an angle of departure, terminal transmit beamforming, terminal receive beamforming, spatial channel correlation, base station transmit beamforming, base station receive beamforming, an average channel gain, an average channel delay, delay spread, Doppler spread, Doppler frequency shift (Doppler shift), a spatial receive parameter (spatial Rx parameters), and the like.

These spatial characteristic parameters describe a spatial channel characteristic between the antenna port of the source reference signal and the antenna port of the target reference signal, and help the terminal device complete a transmit-side beamforming or transmit-side processing process based on the spatial correlation information. It should be understood that the terminal may transmit the target reference signal based on transmit beam information of the source reference signal indicated by the spatial correlation information.

Figure 2:
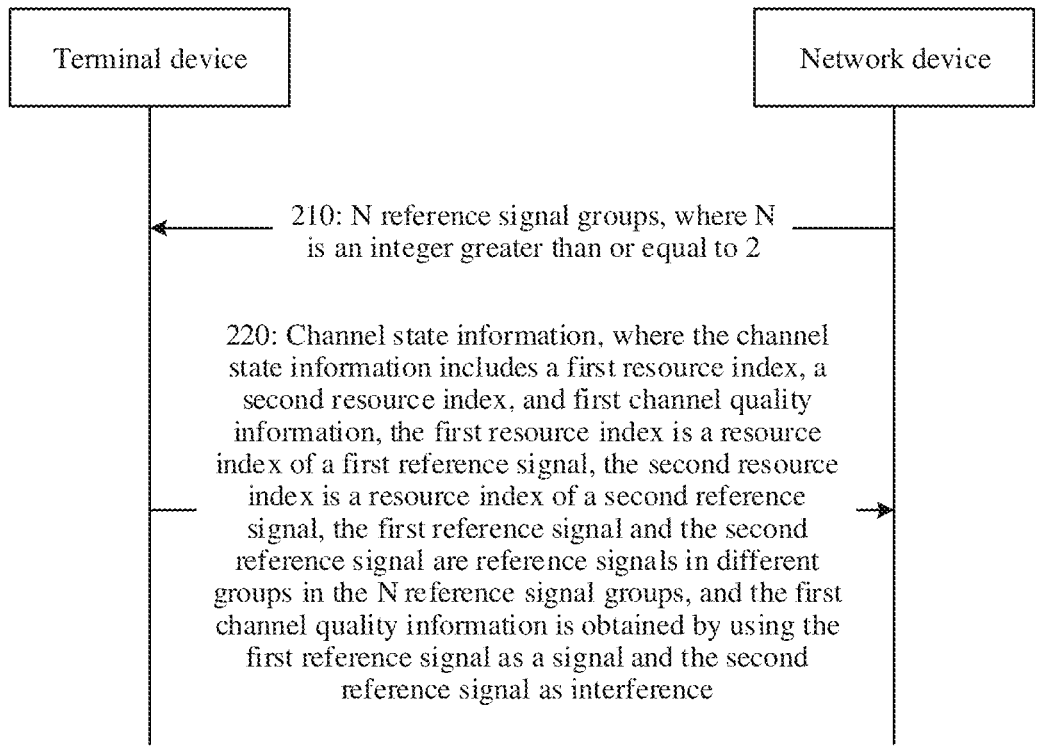
FIG. 2 is a schematic diagram of a channel state information transmission method according to an embodiment.

FIG. 2 is a schematic flowchart of a channel state information transmission method according to an embodiment. The method in FIG. 2 may be applied to a network architecture in FIG. 1. The method in FIG. 2 includes the following steps.

210: Receive N reference signal groups, where N is an integer greater than or equal to 2.

In this embodiment, a terminal device may receive the N reference signal groups based on N reference signal resource sets configured by a network device. The terminal device may receive one group of reference signals at one reference signal resource set configured by the network device, in other words, the terminal device receives the N reference signal resource sets configured by the network device, and the terminal device may receive the N reference signal groups at the N reference signal resource sets.

For example, the network device configures the N reference signal resource sets, and the N reference signal resource sets include at least one resource set used for channel measurement. In other words, the terminal device receives the N reference signal groups at the N resource sets, and the N reference signal groups may include at least one reference signal group used for channel measurement.

For example, the network device configures the N reference signal resource sets, and all the N resource sets are resource configurations used for channel measurement. In other words, the terminal device receives the N reference signal groups, and all the N reference signal groups may be reference signal groups used for channel measurement.

For example, the network device configures the N reference signal resource sets, and the N reference signal resource sets include at least one resource set used for channel (or signal) measurement and at least one resource set used for interference measurement. In other words, the terminal device receives the N reference signal groups, and the N reference signal groups include at least one reference signal group used for channel measurement and at least one reference signal group used for interference measurement.

In a possible implementation, the network device configures the N reference signal resource sets, and the N reference signal resource sets include at least one resource set used for channel (or signal) measurement and at least one resource set used for interference measurement. The reference signal resource set used for channel measurement and the reference signal set used for interference measurement may belong to different resource configurations.

For example, resource configurations of N reference signals include that a reference signal resource in a first resource set is a CMR and a reference signal resource in a second resource set is an IMR. The CMR may be an NZP CSI-RS or an SSB, and the IMR may be a CSI-IM or an NZP CSI-RS. In other words, the first resource set and the second resource set may be different resource configurations.

It should be understood that, in this embodiment, the terminal device may receive the N reference signal groups based on the N reference signal resource sets configured by the network device. Different resource sets may be resources used as a signal or may be resources used as interference.

220: Send channel state information, where the channel state information includes a first resource index, a second resource index, and first channel quality information, the first resource index is a resource index of a first reference signal, the second resource index is a resource index of a second reference signal, the first reference signal and the second reference signal are reference signals in different groups in the N reference signal groups, and the first channel quality information is obtained by using the first reference signal as a signal and the second reference signal as interference.

In this embodiment, the terminal device receives the N reference signal groups based on the N reference signal resource sets configured by the network device, selects a signal used as a signal and a signal used as interference from the N reference signal groups, measures channel quality information, and reports the channel quality information to the network device.

It should be understood that, in this embodiment, the second resource index may include resource indexes of one or more second reference signals, and a reference signal used as an interference item is referred to as the second reference signal.

It should be further understood that, optionally, a quantity of first resource indexes and a quantity of second resource indexes may be configured by the network device, or may be predefined in a protocol, or may be reported by the terminal device.

In another optional implementation, a sum of a quantity of first resource indexes and a quantity of second resource indexes may be configured by the base station, or may be predefined in a protocol, or may be reported by the terminal device. The quantity of first resource indexes may be configured by the base station, predefined in a protocol, or reported by the terminal device.

Optionally, a reference signal corresponding to the first resource index and a reference signal corresponding to the second resource index are reference signals that are simultaneously received by the terminal device and/or simultaneously sent by the network device.

It should be understood that, in this embodiment, "simultaneously" means receiving at a same moment, receiving at overlapping moments, receiving in a same time unit, or receiving in at least one overlapping time unit, and M reference signals overlap in at least one time unit. The time unit may be one or more radio frames, one or more subframes, one or more timeslots, one or more mini-slots, one or more orthogonal frequency division multiplexing (OFDM) symbols defined in an LTE system or a 5G NR system, or may be a time window including a plurality of frames or subframes, for example, a system information (SI) window. The following embodiment is described by using an example in which simultaneously received reference signals are reference signals received on one or more OFDM symbols. This is not limited in the embodiments.

For example, the reported channel state information may include one first resource index, one second resource index, and the first channel quality information; or the reported channel state information may include one first resource index, two second resource indexes, and the first channel quality information. The first resource index may be a resource index of a first reference signal used as a signal, and the second index may be a resource index of a second reference signal used as interference. The embodiments set no limitation on the quantity of second resource indexes.

It should be noted that the first channel quality information may be an SINR (such as an L1-SINR), a CQI, RSRQ, an SNR, or other information that can indicate a channel state/channel quality.

In a possible implementation, the terminal device may receive first configuration information sent by the network device, and the first configuration information may indicate that all the N resource sets are CMRs, in other words, all the N resource sets are resource sets used for channel measurement. In other words, the first configuration information may indicate that the N reference signal groups received by the terminal device are reference signal groups used for channel measurement.

Descriptions are provided below by using an example in which the network device configures two resource sets. It should be understood that the network device may configure the N resource sets for the terminal device, where N is an integer greater than 2.

Figure 3:
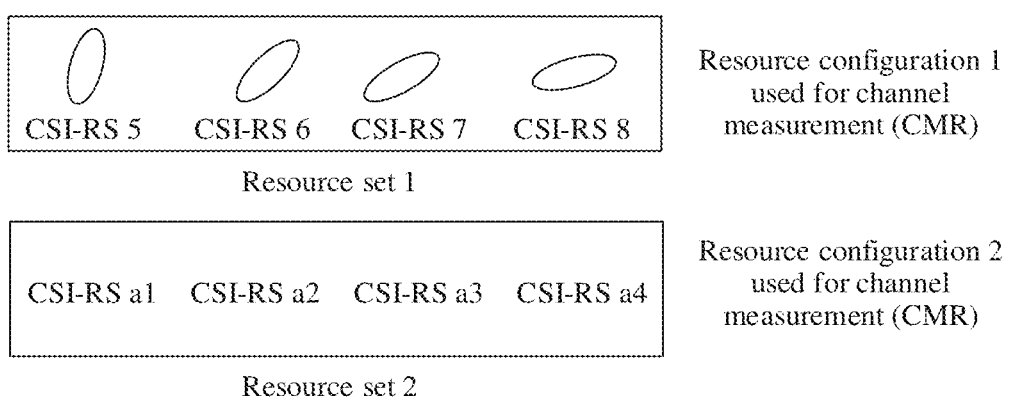
FIG. 3 is a schematic diagram of a resource set configured by a network device according to an embodiment.

For example, as shown in FIG. 3, the network device configures two reference signal resource sets including a resource set 1 and a resource set 2. Both the resource set 1 and the resource set 2 are resource sets used for channel measurement, and the resource set 1 and the resource set 2 may belong to different resource configurations.

For example, the resource set 1 may be an NZP CSI-RS resource, and the resource set 2 may be an SSB resource. Alternatively, the resource set 1 may be an SSB resource, and the resource set 2 may be an NZP CSI-RS resource. In other words, the two reference signal resource sets configured by the network device may belong to different resource configurations.

Figure 4:
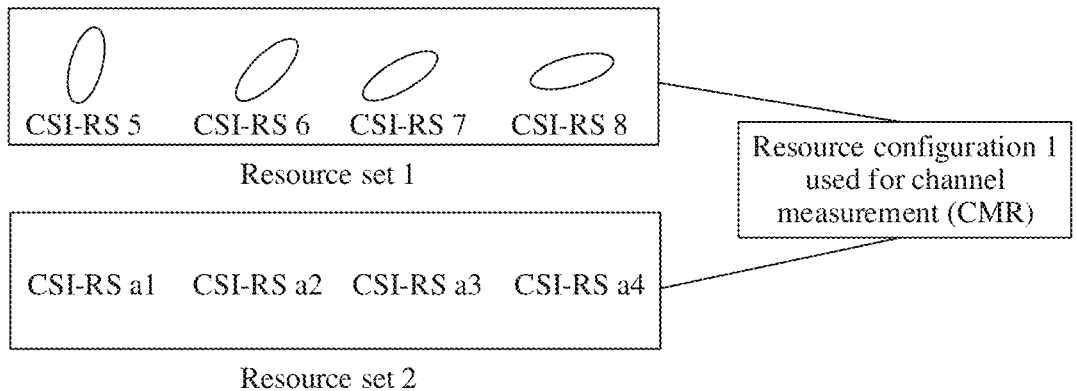
FIG. 4 is a schematic diagram of a resource set configured by a network device according to an embodiment.

For example, as shown in FIG. 4, the network device configures two reference signal resource sets including a resource set 1 and a resource set 2. Both the resource set 1 and the resource set 2 are resource sets used for channel measurement, and the resource set 1 and the resource set 2 may belong to a same resource configuration.

For example, both the resource set 1 and the resource set 2 may be NZP CSI-RS resources; or both the resource set 1 and the resource set 2 may be SSB resources. In other words, the two reference signal resource sets configured by the network device may belong to a same resource configuration.

In other words, the terminal device may receive the first configuration information sent by the network device, and the first configuration information may indicate that all the N resource sets are CMRs. For example, the first configuration information may indicate the two resource sets shown in FIG. 3 or FIG. 4.

For example, the terminal device may receive the first configuration information sent by the network device, and the first configuration information indicates that all the N resource sets are resources used for channel measurement, in other words, the terminal device receives N reference signal groups that are all used for channel measurement. The terminal device determines one reference signal group from the N reference signal groups and determines the first reference signal from the one reference signal group, and the terminal device may determine one or more second reference signals used as interference from N−1 reference signal groups based on the first reference signal. The first reference signal is used as a signal item and the one or more second reference signals are used as interference items to measure the channel quality information.

Optionally, the terminal device may determine, from the N−1 reference signal groups based on the first reference signal, one or more second reference signals that may be received simultaneously with the first reference signal, where the N−1 reference signal groups do not include a reference signal group in which the first reference signal is located.

In a possible implementation, when the first configuration information indicates that a reference signal resource set in which the second reference signal is located is a reference signal resource set used for channel measurement, the terminal device may report the second channel quality information.

For example, when all the N resource sets configured by the network device are CMRs, in other words, all the N reference signal groups received by the terminal device are reference signal groups used for channel measurement, the terminal device further sends the second channel quality information to the network device, where the second channel quality information is channel quality measured by using the second reference signal as a signal item and the first reference signal as an interference item for the second reference signal.

The network device may configure the N resource sets for the terminal device, where N is a positive integer greater than or equal to 2. An example in which the network device configures two resource sets for the terminal device is used for description. The network device may configure the first resource set as a resource set used for channel measurement.

Optionally, when resource configuration information sent by the network device to the terminal device indicates that the second resource set is used for channel measurement, the terminal device may report the second channel quality information, where the second channel quality information is determined by using the second reference signal as a signal item and the first reference signal as an interference item for the second reference signal.

Optionally, when the resource configuration information sent by the network device to the terminal device indicates that the second resource set is used for interference measurement, the terminal device may not report the second channel quality information.

For example, the terminal device receives the N resource sets configured by the network device, in other words, receives the N reference signal groups. The terminal device may select A RSs from the N RS sets, where A is less than or equal to N, and the A RSs are separately from different RS sets, in other words, a maximum of one RS is selected for each RS set. The UE measures channel quality information by using one RS in the A RSs as a signal item and another RS in the A RSs as an interference item.

For example, the terminal device receives an RS set 1 and an RS set 2 that are used for channel quality information measurement, where the RS set 1 includes L1 reference signals, and the RS set 2 includes L2 reference signals. L1 may be equal to L2, or L1 may not be equal to L2. The terminal device may select a first reference signal from the RS set 1 as a signal item, and the terminal device may then select a reference signal RS X1 from the RS set 2 as an interference item, to obtain the channel quality information through calculation. For example, an L1-SINR 1 may be obtained through calculation.

It should be noted that the terminal device may select, from the RS set 2, a reference signal that can be received simultaneously with the reference signal used as a signal item. The UE may sequentially poll each reference signal in the RS set 1 to calculate an L1-SINR, to obtain a total of L1 L1-SINRa.

Optionally, the UE may further obtain L1 or L2 L1-SINRb by using a reference signal in the RS set 2 as a signal item and a reference signal in the RS set 1 as an interference item.

For example, the UE may select B reference signals with largest L1-SINRa and a measurement result from the L1 reference signals, or the UE selects, from the L1 reference signals, K reference signals with a corresponding largest average value or equivalent value of L1-SINRa and L1-SINRb and a measurement result, and reports the K reference signals and the measurement result to the network device.

In other words, when both the RS set 1 and the RS set 2 are resources used for channel quality information measurement, the UE may report the first channel quality information and the second channel quality information. The first channel quality information may be channel quality measured by using a reference signal in the RS set 1 as a signal term and a reference signal in the RS set 2 as an interference term. The second channel quality information may be channel quality measured by using a reference signal in the RS set 2 as a signal term and a reference signal in the RS set 1 as an interference term.

Optionally, the UE may further send first identifier information and/or second identifier information, where the first identifier information is used to indicate an identifier of the reference signal group in which the first reference signal is located, and the second identifier information is used to indicate an identifier of a reference signal group in which the second reference signal is located.

For example, when all the N resource sets are CMRs, the first resource index and the second resource index that are reported by the UE may be from different RS sets. Optionally, the UE may further report an ID of a corresponding set in which the first resource index is located and/or an ID of a corresponding set in which the second resource index is located.

In a possible implementation, the terminal device may receive second configuration information sent by the network device, and the second configuration information may indicate that M resource sets in the N resource sets are CMRs and N-M resource sets are IMRs. In other words, the second configuration information may indicate that the N reference signal groups include M channel measurement reference signal groups and N-M interference measurement reference signal groups, where N is greater than or equal to 2, M is less than or equal to N, and M may be equal to 1.

Descriptions are provided by using an example in which the network device configures two resource sets. It should be understood that the network device may configure the N resource sets for the terminal device, where N is an integer greater than 2.

Optionally, the terminal device may select one first reference signal from the first resource set, select one or more second reference signals from the second resource set, and report a resource index of the first reference signal, resource indexes of the one or more second reference signals, and the first channel quality information to the network device.

Optionally, the terminal device may select a first reference signal used as a signal item from the first resource set, and select one or more second reference signals used as interference items from the first resource set and the second resource set. Further, optionally, one or more second reference signals that are selected by the terminal device from the first resource set and that are used as interference items are different from the first reference signal.

In a possible implementation, the terminal device may select a reference signal used as an interference item from the first resource set for measurement of MU interference, and/or inter-TRP interference, and/or interference between a plurality of beams, and may select a reference signal used as an interference item from the second resource set for measurement of inter-cell interference.

In a possible implementation, the terminal device may select a reference signal used as an interference item from the first resource set for measurement of MU interference, inter-TRP interference, or interference between a plurality of beams, and may select a reference signal used as an interference item from the second resource set for interference measurement of inter-cell interference, MU interference, or inter-TRP interference. This may also be understood as that the reference signal used as the interference item is selected from the first resource set to measure a part of interference, and the reference signal used as the interference item is selected from the second resource set to measure the other part of interference. Types of interference measured by using at least two reference signals selected from different sets as interference items may be different or not entirely the same.

In a possible implementation, the terminal device may select a reference signal used as an interference item from the first resource set for measurement of inter-cell interference and/or MU interference/coordinating set interference/ inter-beam interference, and may select a reference signal used as an interference item from the second resource set for measurement of inter-cell interference or inter-beam interference.

It should be understood that, optionally, the inter-beam interference may also be referred to as interference between a plurality of transmission streams or interference between a plurality of transmission layers, and may be interference between a plurality of transmit beams of the network device when the plurality of transmit beams serve a same terminal device. The MU interference may be interference between a plurality of users transmitted in pairs on a same time-frequency resource (or may be understood as interference caused to a terminal device when a network device serves another terminal device). The inter-TRP interference is interference between a plurality of TRPs in a coordinating set when the plurality of TRPs serve a same terminal device (or may be understood as interference caused by a TRP to a terminal device when another TRP serves the terminal device).

Figure 5:
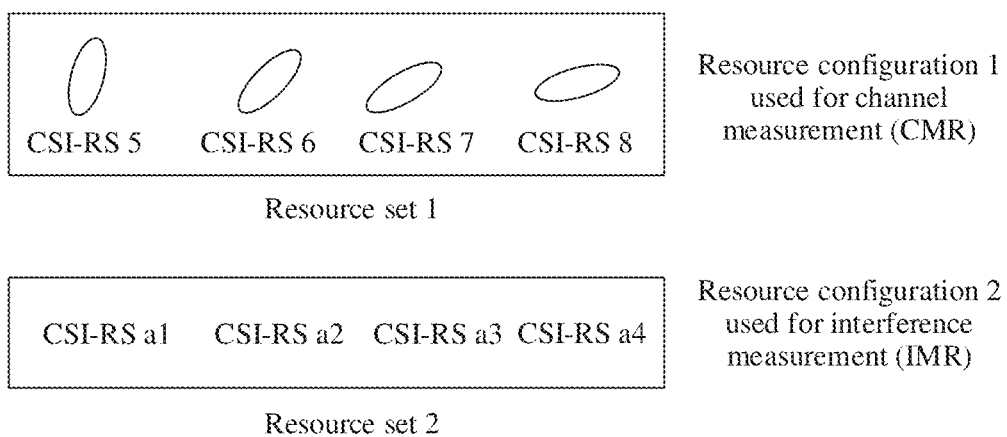
FIG. 5 is a schematic diagram of a resource set configured by a network device according to an embodiment.

In another possible implementation, optionally, the terminal device may further select a third reference signal used as an interference item from a third resource set. With reference to the foregoing method, the terminal device may determine the channel quality information (for example, the first channel quality information) based on the first reference signal, the second reference signal, and the third reference signal, and a resource index of the third reference signal may be not reported. For example, the third resource set may be a zero-power ZP resource configuration. For example, as shown in FIG. 5, the network device configures two reference signal resource sets including a resource set 1 and a resource set 2. The resource set 1 may be a resource set used for channel measurement, and the resource set 2 may be a resource set used for interference measurement, in other words, M may be equal to 1.

In other words, the UE may receive the N resource sets configured by the network device. The N resource sets include at least one resource set that belongs to a resource configuration used for channel (or signal) measurement, and the N resource sets include at least one resource set that belongs to a resource configuration used for interference measurement. It should be understood that FIG. 5 is an example for description when N=2.

For example, the terminal device may receive the second configuration information sent by the network device, and the second configuration information indicates that M resource sets in the N resource sets are resources used for channel measurement and N-M resource sets are resources used for interference measurement. In other words, the N reference signal groups received by the terminal device include M channel measurement reference signal groups and N-M interference measurement reference signal groups. The terminal device determines one reference signal group from the M reference signal groups and determines the first reference signal from the one reference signal group, and the terminal device may determine one or more second reference signals used as interference from the N-M reference signal groups based on the first reference signal. The first reference signal is used as a signal item and the one or more second reference signals are used as interference items to measure the channel quality information.

For example, the UE may receive the N resource sets configured by the network device, in other words, receive the N reference signal groups. The UE includes a CMR RS sets and b IMR RS sets in the N RS sets. The UE calculates the channel quality information by using one RS in the a RS sets as a signal item and one or more RSs in the other b RS sets as interference items.

Optionally, the UE may further send third identifier information, and the third identifier information is used to indicate an identifier of a reference signal group in which the second reference signal is located.

In other words, when the N resource sets include an IMR, the second resource index reported by the UE may be from different RS sets. In this case, the UE further needs to report an ID of a corresponding set in which the second resource index is located.

For example, the network device may configure three resource sets. For example, the three resource sets separately correspond to three TRPs. The UE may select two TRPs or three TRPs of NCJT. The UE needs to obtain a plurality of pieces of channel quality information through measurement based on different transmission assumptions, and report the plurality of pieces of channel quality information to the network device, to recommend a transmission manner or a serving TRP used during data transmission.

In this embodiment, the UE may report the first resource index, the second resource index, and the first channel quality information to the network device. For example, the UE may report CRI 1+IMR 1+L1-SINR 1, where the CRI 1 is a reference signal in a resource set used for channel measurement, the IMR 1 is a reference signal in a resource set used for interference measurement, and the L1-SINR 1 is calculated based on a signal measured on the CRI 1 and interference measured on the IMR 1.

Optionally, the UE may report CRI 1+CRI 2+L1-SINR 1+L1-SINR 2 based on different resource configurations of the network device, where the CRI 1 is a reference signal in the first resource set, the CRI 2 is a reference signal in the second resource set, the L1-SINR 1 is calculated based on a signal measured on the CRI 1 and interference measured on the CRI 2, and the L1-SINR 2 is calculated based on a signal measured on the CRI 2 and interference measured on the CRI 1.

Optionally, the UE may report CRI 1+CRI 2+CRI 3+L1-SINR 1+L1-SINR 2+L1-SINR 3, where the L1-SINR 1 may be obtained based on a signal measured on the CRI 1 and interference measured on the CRI 2 and the CRI 3, the L1-SINR 2 may be obtained based on a signal measured on the CRI 2 and interference measured on the CRI 1 and the CRI 3, and the L1-SINR 3 may be obtained based on a signal measured on the CRI 3 and interference measured on the CRI 1 and the CRI 2.

In a possible implementation, when the network device configures group based beam reporting, the UE may report the first resource index, the second resource index, and the channel quality information to the network device based on the foregoing method.

In a possible implementation, when the network device configures non-group based beam reporting, the UE may measure the channel quality information based on the foregoing method. When performing reporting to the network device, the UE may not report a resource ID of the reference signal used as an interference item, but use, as an interference item used for calculating an L1-SINR, an average value of interference measured on an IMR resource corresponding to the CMR.

For example, L1-SINR 1=L1-RSRP 5/average (L1-RSRP 1+L1-RSRP 2+L1-RSRP 3).

In this embodiment, when measuring the channel state information, the terminal device can determine a reference signal used as a signal and a reference signal used as interference that are simultaneously received, and when reporting the channel state information to the network device, the terminal device may report a resource index of the reference signal used as a signal, a resource index of the reference signal used as interference, and the measured channel quality information. In other words, in this embodiment, the terminal device may select, based on the resource configuration of the network device, a resource used as interference, and does not need to measure channel quality based on the configuration of the network device, thereby avoiding measurement of channel quality information between a resource used as a signal and a resource used as interference that cannot be simultaneously received, and improving resource utilization efficiency.

In an optional implementation, the terminal device may report one or more pieces of channel state information, for example, K pieces of channel state information, where K is an integer greater than or equal to 1. An amount of channel state information reported by the terminal device may be configured by the network device, or predefined in a protocol, or reported by the terminal device.

In a possible implementation, the K pieces of channel state information may be mapped and encoded in the following bit sequence, and when the channel state information includes the first resource index, the second resource index, and the first channel quality information, for example, the channel state information may be reported by using the following method 1 and method 2.

Manner 1: all first resource indexes→all second resource indexes→all first channel quality. In other words, first, all the first resource indexes are mapped, and then all the second resource indexes are mapped, and finally all the first channel quality is mapped. It should be understood that all the first resource indexes, all the second resource indexes, and all the first channel quality are a first resource index, a second resource index, and first channel quality that are in the K pieces of channel state information.

Manner 2: first resource index 1→second resource index 1→ . . . →first resource index K→second resource index K→ . . . →first channel quality 1→ . . . →first channel quality K. In other words, resource indexes in all the channel state information are first sequentially mapped, and then channel quality in all the channel state information is sequentially mapped.

It should be noted that K first resource indexes may be different, and K second resource indexes may be the same.

Optionally, a first piece of channel state information may be first mapped, and then a second piece of channel state information is mapped, and then other channel state information may be sequentially mapped.

For example, the manner 1 is shown in Table 1, and the manner 2 is shown in Table 2.

TABLE 1

| CSI report number | CSI domain |
|---|---|
| CCSI report #n | First resource index 1 |
|  | First resource index 2 |
|  | . . . |
|  | First resource index K |
|  | Second resource index 1 |
|  | Second resource index 2 |
|  | . . . |
|  | Second resource index N |
|  | First channel quality 1 |
|  | First channel quality 2 |
|  | . . . |
|  | First channel quality K |

TABLE 2

| CSI report number | CSI domain |
|---|---|
| CSI report #n | First resource index 1 |
|  | Second resource index 1 |
|  | First resource index 2 |
|  | Second resource index 2 |
|  | . . . |
|  | . . . |
|  | First resource index N |
|  | Second resource index N |
|  | First channel quality 1 |
|  | First channel quality 2 |
|  | . . . |
|  | First channel quality N |

When the channel state information may include the first resource index, the second resource index, the first channel quality information, and the second channel quality, the channel state information is reported by using the following method 3 and method 4.

Manner 3: all first resource indexes→all second resource indexes→all first channel quality→all second channel quality. In other words, first, all the first resource indexes are encoded, and then all the second resource indexes are encoded, and then all the first channel quality is encoded, and finally all the second channel quality is encoded.

Manner 4: first resource index 1→second resource index 1→ . . . →first resource index K→second resource index K→first channel quality 1→second channel quality 1→ . . . →first channel quality K→second channel quality K. In other words, first resource indexes and second resource indexes in all the channel state information are first sequentially mapped, and then first channel quality and second channel quality in all the channel state information are sequentially mapped.

The manner 3 is shown in Table 3, and the manner 4 is shown in Table 4.

TABLE 3

| CSI report number | CSI domain |
|---|---|
| CCSI report #n | First resource index 1 |
|  | First resource index 2 |
|  | . . . |
|  | First resource index K |
|  | Second resource index 1 |
|  | Second resource index 2 |
|  | . . . |
|  | Second resource index K |
|  | First channel quality 1 |
|  | First channel quality 2 |
|  | . . . |
|  | First channel quality K |
|  | Second channel quality 1 |
|  | Second channel quality 2 |
|  | . . . |
|  | Second channel quality K |

TABLE 4

| CCSI report number | CSI domain |
|---|---|
| CCSI report #n | First resource index 1 |
|  | Second resource index 1 |
|  | First resource index 2 |
|  | Second resource index 2 |
|  | . . . |
|  | . . . |
|  | First resource index K |
|  | Second resource index K |

TABLE 4-continued

| CCSI report number | CSI domain |
| --- | --- |
| | First channel quality 1 |
| | Second channel quality 1 |
| | First channel quality 2 |
| | Second channel quality 2 |
| | ... |
| | ... |
| | First channel quality K |
| | Second channel quality K |

Optionally, a first piece of channel state information may be first mapped, and then a second piece of channel state information is mapped, and then other channel state information may be sequentially mapped.

Optionally, the channel quality information may be reported in a non-differential manner or reported in a differential manner. When the differential manner is used for reporting, there are the following several methods:

Differential method 1: Channel quality in a group is differentiated, for example, for each piece of channel state information, if the channel state information includes first channel quality and second channel quality, the first channel quality and the second channel quality are reported in a differential manner. For example, the second signal channel quality is reported by using a difference value and by using the first channel quality as a reference. In other words, the terminal device reports the first channel quality and a difference value between the first channel quality and the second channel quality. Optionally, channel quality as a reference value may be a maximum value or a minimum value in the first channel quality and the second channel quality, an average value of the first channel quality and the second channel quality, or the like.

Differential method 2: Channel quality of a same type is differentiated, for example, in the K pieces of channel state information, first channel quality is reported in a differential manner, for example, first channel quality 1 is used as a reference value, and first channel quality 2 to first channel quality K are reported in a differential manner. In other words, the terminal device reports the first channel quality 1 and difference values between each of the first channel quality 1 to K and the first channel quality 1. There is a similar method for second channel quality. For example, second channel quality 1 is used as a reference value, and second channel quality 2 to second channel quality K are reported in a differential manner. In other words, the terminal device reports the second channel quality 1 and difference values between each of the second channel quality 1 to K and the second channel quality 1. Optionally, channel quality as a reference value may be a maximum value or a minimum value in all channel quality or the channel quality of the same type, an average value of all channel quality or the channel quality of the same type, or the like.

Differential method 3: All channel quality is differentiated, for example, the K pieces of channel quality information include first channel quality and second channel quality. One of the channel quality is used as a reference value, and the other channel quality is reported in a differential manner. A difference value between the reference channel quality and the other channel quality is reported. Optionally, channel quality as a reference value may be a maximum value or a minimum value in all channel quality or channel quality of a same type, an average value of all channel quality or channel quality of a same type, or the like.

It should be understood that, optionally, the difference value means a difference or a ratio between two quantities.

It should also be understood that, optionally, a manner in which the terminal device reports the channel state information may be indicated by the network device, or reported by the terminal device, or predefined in a protocol.

It should be further understood that, in the foregoing method for reporting the channel state information by the terminal device, the network device may decode the channel state information based on the foregoing method. A decoding manner may be predefined, or may be configured by the network device, or may be reported by the terminal device.

Figure 6:
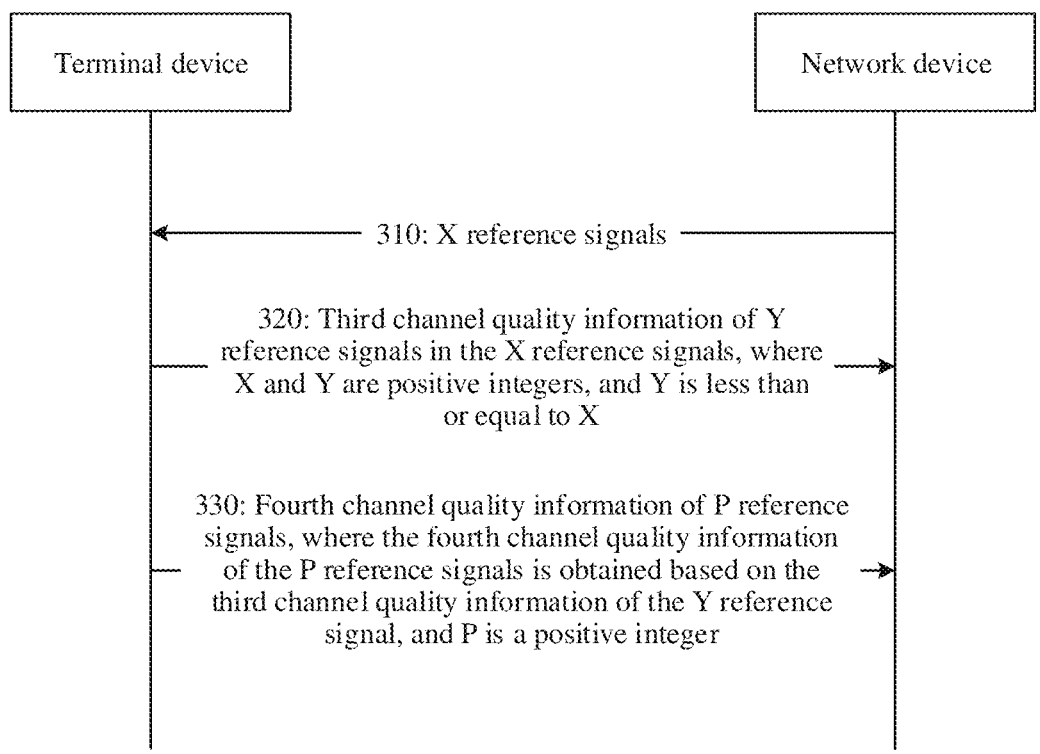
FIG. 6 is a schematic diagram of a channel state information transmission method according to another embodiment.

FIG. 6 is a schematic flowchart of a channel state information transmission method according to an embodiment. The method in FIG. 6 may be applied to a network architecture in FIG. 1. The method in FIG. 6 includes the following steps.

310: A terminal receives X reference signals, where X is a positive integer.

320: Send third channel quality information of Y reference signals in the X reference signals, where X and Y are positive integers, and Y is less than or equal to X.

It should be noted that, in this embodiment, the third channel quality information may be RSRP. The third channel quality information may be alternatively information such as signal power/signal energy/signal strength.

For example, before the terminal device receives the X reference signals, the terminal device may receive first report configuration information, and the first report configuration information may be configuration information sent by one network device, or may be configuration information sent by a plurality of different network devices. The first configuration information may indicate a first resource configuration and a first report quantity, first resource configuration information may indicate resources of the X reference signals, and first to-be-reported channel quality information is the third channel quality information.

In other words, the terminal device may receive resource configuration information of X reference signals sent by one network device, to receive the X reference signals. Alternatively, resource configuration information sent by a plurality of network devices to the terminal device indicates the resources of the X reference signals.

For example, a report configuration may include the following fields:

| | CSI-ReportConfig ::= | SEQUENCE { |
| --- | --- | --- |
| | reportConfigId | CSI-ReportConfigId, |
| | carrier | ServCellIndex |
| OPTIONAL, | -- Need S | |
| | resourcesForChannelMeasurement | CSI-ResourceConfigId, |
| | csi-IM-ResourcesForInterference | CSI-ResourceConfigId |
| OPTIONAL, | -- Need R | |
| | nzp-CSI-RS-ResourcesForInterference | CSI-ResourceConfigId |
| OPTIONAL, | -- Need R | |
| | reportQuantity | CHOICE { |
| | none | NULL, |

| | |
|---|---|
| cri-RI-PMI-CQI | NULL, |
| cri-RI-i1 | NULL, |
| cri-RI-CQI | NULL, |
| cri-RSRP | NULL, |
| ssb-Index-RSRP | NULL, |
| cri-L1-SINR | NULL, |
| ssb-Index-L1-SINR | NULL, |
| ...... | |
| }, | |
| ...... } | |

CSI-ReportConfig may represent report configuration information, reportQuantity may represent a report quantity, cri-RSRP may represent a type of third channel quality, cri-L1-SINR may represent a type of fourth channel quality information, and CSI-ResourceConfigId may be used to indicate resource configuration information, for example, resourcesForChannelMeasurement is used to indicate the first resource configuration, csi-IM-ResourcesForInterference may indicate a second resource configuration, and nzp-CSI-RS-ResourcesForInterference may also indicate the second resource configuration. Optionally, the terminal device may receive first report configuration information sent by a first network device, and the first report configuration information indicates the resources of the X reference signals. Alternatively, the terminal device may receive first report configuration information separately sent by a first network device and a second network device, and a sum of resources indicated by the two pieces of first report configuration information is the resources of the X reference signals. In other words, the terminal device may receive one or more pieces of first report configuration information.

For example, the terminal device may determine the resources of the X reference signals based on the received first report configuration information, and receive the X reference signals. The first report quantity indicated in the first report configuration information is the third channel quality information, in other words, a type of the first to-be-reported channel quality may be RSRP. The terminal device may measure RSRP of the received X reference signals, and determine Y reference signals with relatively good RSRP in the X reference signals. The terminal device sends the RSRP of the Y reference signals to the network device.

It should be noted that the terminal device determines Y reference signals of relatively good channel quality based on the measured RSRP of the X reference signals, and reports the Y reference signals to the network device. Resource configurations of the X reference signals may be from one network device, or may be from configuration performed by a plurality of network devices on the terminal device. Therefore, the reported Y reference signals may be resources configured by one network device, or may be resources configured by different a plurality of network devices.

Optionally, the network device receives the third channel quality information of the Y reference signals reported by the terminal device, and sends second report configuration information to the terminal device. The second report configuration information indicates a second resource configuration and a second report quantity, the second resource configuration indicates resources of L reference signals and resources of Q third reference signals, the L reference signals are reference signals used for channel measurement, the third reference signals are reference signals used for interference measurement, the second report quantity is fourth channel quality information, and Q is a positive integer.

330: Send fourth channel quality information of P reference signals, where the fourth channel quality information of the P reference signals is obtained based on the third channel quality information of the Y reference signals.

In this embodiment, the second report configuration and the first report configuration meet an association relationship, in other words, the terminal device may receive the X reference signals, select Y better reference signals by measuring L1-RSRP of the X reference signals and report the Y better reference signals to the network device, and then report the channel quality information of the P reference signals based on L1-RSRP of the Y reference signals, for example, report L1-SINR of the P reference signals based on the L1-RSRP of the Y reference signals, to determine a better reference signal. The association relationship of the two report configurations is established, so that resource overheads can be effectively reduced, reporting overheads can be reduced, and computational complexity can be reduced.

Optionally, in this embodiment, the fourth channel quality information may be any one of the following: a signal to interference plus noise ratio, a signal-to-noise ratio, a channel quality indicator, and reference signal received quality.

It should be noted that the terminal device receives the second report configuration information, and the second configuration information indicates the resources of the L reference signals and the resources of the Q third reference signals. The terminal device may send the fourth channel quality information of the P reference signals in the L reference signals based on the third channel quality information for sending the Y reference signals. In other words, an intersection set of the L reference signals and the Y reference signals is a non-empty subset, and the P reference signals are a subset of the L reference signals.

For example, in a beam training process, X=64, Y=8, L=4, and P=2. In other words, the terminal device may receive 64 reference signals based on a resource configuration, and the terminal device may determine eight reference signals with relatively good RSRP from the 64 reference signals. Resources of four reference signals may be configured in the second configuration information received by the terminal device, in other words, channel quality information of the four reference signals may be measured, and a signal to interference plus noise ratio, a signal-to-noise ratio, a channel quality indicator, reference signal received quality, or the like may be measured. The terminal device may send two better reference signals to the network device based on a measurement result.

Optionally, the terminal device further needs to report reference signal resource indexes corresponding to the two reference signals.

For example, the second report configuration and the first report configuration meet a first association relationship, in other words, the first report configuration may be indexed based on the second report configuration, and a second report quantity indicated by the second report configuration may be obtained based on the first report quantity. In other words, the first association relationship may indicate that the fourth channel quality information of the P reference signals is determined based on the third channel quality information of the Y reference signals.

Optionally, the first association relationship may be an association relationship predefined in a protocol or configured by the network device.

For example, the second report configuration information may include the identification information indicating the first report configuration information.

For example, the identification information in the second report configuration information may indicate a first report configuration index (report config ID).

For example, the identification information in the second report configuration information may indicate a first resource configuration index (resource config ID).

For example, the second resource configuration and the first resource configuration meet a second association relationship, in other words, the first resource configuration may be indexed based on the second resource configuration, and the second association relationship may indicate that the fourth channel quality information of the P reference signals is sent based on the third channel quality information of the Y reference signals.

For example, the second association relationship may be an association relationship that is indicated by the second resource configuration information and that is of a transmission time sequence of the P reference signals and/or the Q third reference signals and the X reference signals.

For example, the sending fourth signal quality information of P reference signals includes the following.

The terminal device receives a second report configuration, where the second report configuration information indicates a second resource configuration and a second report quantity, the second resource configuration indicates the resources of the L reference signals and the resources of the Q third reference signals, the L reference signals are reference signals used for channel measurement, the third reference signals are reference signals used for interference measurement, the second report quantity indicates a type of the fourth channel quality information, and Q is a positive integer. The P reference signals are a subset of the L reference signals. The second report configuration and the first report configuration meet the first association relationship, or the second resource configuration and the first resource configuration meet the second association relationship. The terminal device may send the fourth signal quality information of the P reference signals based on the second report configuration and the first association relationship, or the terminal device may send the fourth signal quality information of the P reference signals based on the second report configuration and the second association relationship.

Optionally, the second association relationship may be an association relationship predefined in a protocol or configured by the network device.

Optionally, all or some of the L reference signals and all or some of the X reference signals meet a QCL relationship, and/or all or some of the Q third reference signals and all or some of the X reference signals meet a QCL relationship.

Optionally, that one or more of the L reference signals and one or more of the X reference signals meet the QCL relationship may be predefined or may be indicated by using signaling (for example, one of RRC signaling, MAC CE signaling, and DCI signaling).

For example, that one of the L reference signals and one of the X reference signals meet the QCL relationship may be predefined; or that one of the L reference signals and a plurality of reference signals in the X reference signals meet the QCL relationship may be predefined. For example, it is assumed that the L reference signals are four reference signals, the X reference signals are four reference signals, and that a first reference signal in the L reference signals and a first reference signal in the X reference signals meet the QCL relationship is predefined, or that a first reference signal in the L reference signals and a first reference signal and a second reference signal in the X reference signals meet the QCL relationship is predefined.

Optionally, that one or more of the Q third reference signals and one or more of the X reference signals meet the QCL relationship may be predefined or may be indicated by using signaling (for example, one of RRC signaling, MAC CE signaling, and DCI signaling).

For example, that one of the Q third reference signals and one of the X reference signals meet the QCL relationship may be predefined; or that one of the Q third reference signals and a plurality of reference signals in the X reference signals meet the QCL relationship may be predefined. For example, it is assumed that the Q third reference signals are four third reference signals, the X reference signals are four reference signals, and that a first third reference signal in the Q third reference signals and a first reference signal in the X reference signals meet the QCL relationship may be predefined, or that a first third reference signal in the Q third reference signals and a first reference signal and a second reference signal in the X reference signals meet the QCL relationship may be predefined.

Optionally, a reference signal that is in the L reference signals and that has a same resource identifier as a reference signal in the X reference signals meets the QCL relationship, and/or a reference signal that is in the Q third reference signals and that has a same resource identifier as a reference signal in the X reference signals meets the QCL relationship. Quasi co-site/quasi co-location QCL assumption information may also be referred to as co-location assumption information. The QCL information is used to assist in describing beamforming information and a receiving procedure on a receive side of the terminal device.

Figure 7:
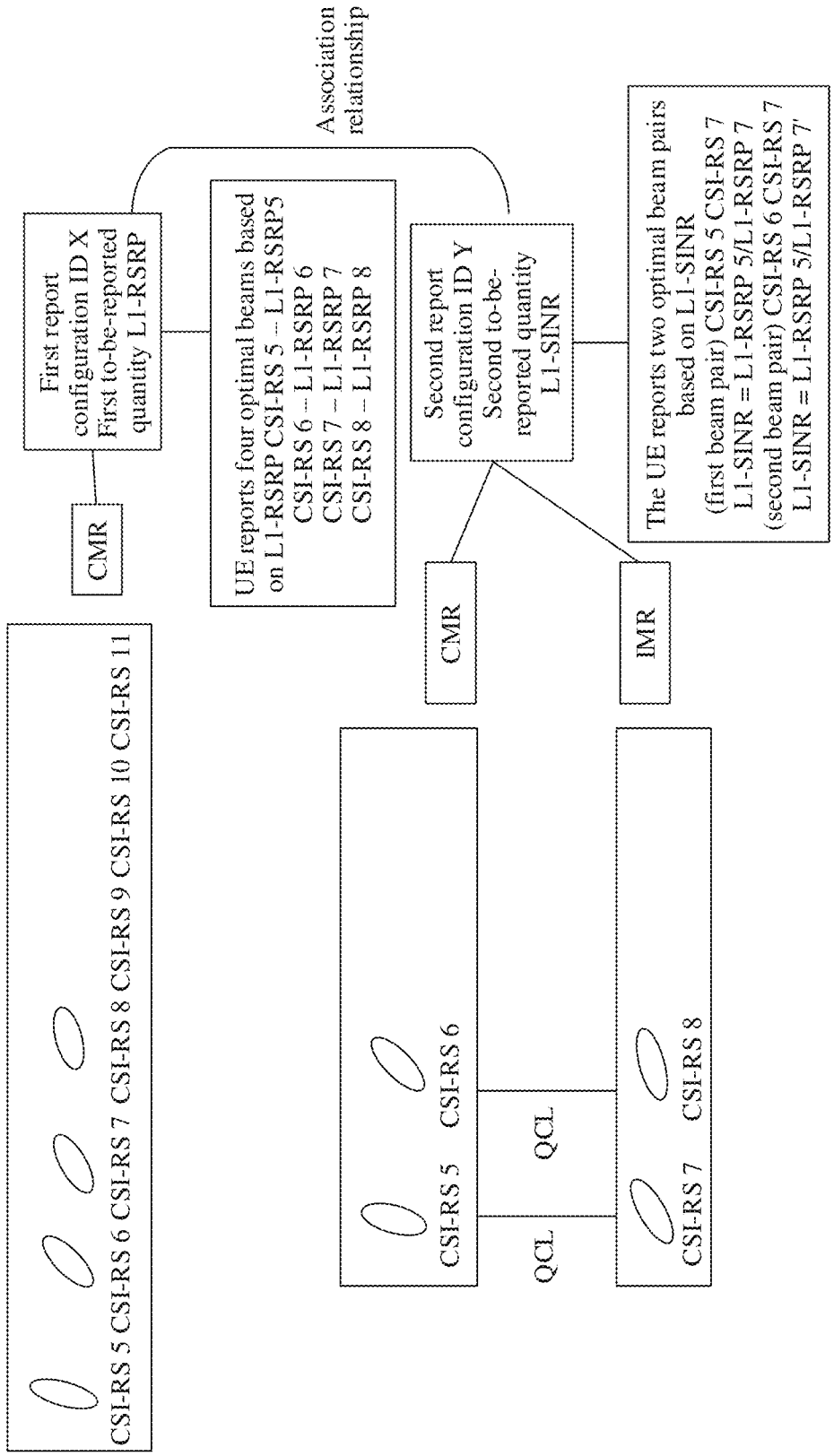
FIG. 7 is a schematic diagram of a resource set configured by a network device according to an embodiment.

For example, the UE receives resource config b1 sent by the network device, measures L1-RSRP of the reference signal in the resource config b1, and reports Y best reference signals and corresponding L1-RSRP. The UE receives resource config b2 sent by the network device, and the resource config b2 and the resource config b1 are in a second association relationship. The UE measures an L1-SINR of the reference signal based on the second association relationship and the resource config b2, and reports P reference signals and corresponding L1-SINRs. For example, that the first report quantity is L1-RSRP and the second report quantity is an L1-SINR is used as an example for description. As shown in FIG. 7, the UE receives a first report configuration Report Config ID X, where the first report configuration may indicate that the first report quantity is L1-RSRP, and the first report configuration is associated with or includes at least one resource configuration (resource config a1), and the at least one resource config includes or indicates at least one reference signal resource set.

As shown in FIG. 7, a first resource set indicated by the first report configuration includes the resources of the X reference signals. The resources of the X reference signals may be a CSI-RS 5, a CSI-RS 6, a CSI-RS 7, a CSI-RS 8, a CSI-RS 9, a CSI-RS 10, and a CSI-RS 11. The terminal device may measure L1-RSRP of the X reference signals to determine Y best reference signals, such as the CSI-RS 5, the CSI-RS 6, the CSI-RS 7, and the CSI-RS 8. The terminal device reports the four reference signals to the network device, and the network device sends a second report configuration Report Config ID Y to the terminal device. The second report configuration may indicate that a type of the second report quantity is an L1-SINR, and indicate the second resource configuration (resource config a2). The second resource configuration (resource config a2) may include a resource used for channel measurement and a resource used for interference measurement. For example, the CSI-RS 5 and the CSI-RS 6 may be CMRs, and the CSI-RS 7 and the CSI-RS 8 may be IMRs. The second report configuration and the first report configuration are in an association relationship. L1-RSRP measured in the first report configuration may be indexed by using the association relationship, and the L1-SINR is determined based on the measured L1-RSRP. Optionally, a correspondence between a reference signal in the CMR and a reference signal in the IMR may be a QCL relationship configured by the network device, or the UE may determine, based on a reference signal in the CMR, reference signals in the IMR that can be simultaneously received and that are used as interference items.

In other words, after receiving the second report configuration information, the terminal device may select a reference signal used as a signal item and an interference signal used as an interference item, and report the fourth channel quality information.

Optionally, the resources of the L reference signals in the second resource configuration indicated by the second report configuration may be a subset of the Y reference signals. As shown in FIG. 7, a resource of a reference signal that is included in the CMR resource set and that is indicated by the second report configuration is a subset of the resources of the reported Y reference signals.

Optionally, the resources of the L reference signals in the second resource configuration indicated by the second report configuration may include another resource configured by a network. For example, the CMR resource set indicated by the second configuration may further include a resource CSI-RS 12 configured by the network device, as shown in FIG. 7.

In other words, the resources of the L reference signals in the second resource configuration may include resources of some Y reference signals, or may include some resources configured by the network device. In other words, an intersection set of the resources of the L reference signals and the resources of the Y reference signals is a non-empty subset. Optionally, there is an association relationship between a Report Config ID X including L1-RSRP and a Report Config ID Y including an L1-SINR, and the association relationship is configured by the base station by using signaling. For example, the Report Config ID X including the L1-RSRP is associated with the Report Config ID Y including the L1-SINR.

Optionally, Resource Config a1 and Resource Config a2 meet a first time sequence relationship. For example, a time interval (start time, end time, and the like) for sending or reporting Resource Config a1 and Resource Config a2 is less than or equal to a first threshold K. The first threshold may be reported based on a capability of the UE, or predefined in a protocol, or configured by the base station.

Optionally, a reference signal in the resource config a1 may be a periodic reference signal or a half-periodic reference signal (for example, may be a CSI-RS or an SSB).

Optionally, a reference signal sent in the resource config a2 is an aperiodic reference signal (for example, may be a CSI-RS). The reference signal is mainly a reference signal used for interference measurement, in other words, an IMR reference signal in the resource config a2 may be an aperiodic reference signal.

Optionally, all or some reference signals in the resource config a2 may be indicated but not sent.

Optionally, a reference signal CMR that is in the resource config a2 and that is used for channel measurement is indicated but not sent. In other words, after the second report configuration information is received, it may indicate that a reference signal in a CMR resource set does not need to be sent again.

Optionally, one or more resource sets may be configured in the resource config a2. When a plurality of resource sets are configured in the resource config a2, the plurality of resource sets may include at least one CMR resource set and at least one IMR resource set, or all the plurality of resource sets may be CMR resource sets.

Optionally, only Q third reference signal resources may be configured for the second resource configuration in this embodiment. Optionally, in this case, the terminal device obtains the fourth channel quality information based on the Y reference signals and the Q third reference signals.

Optionally, a reference signal IMR that is in the resource config a2 and that is used for interference measurement may be sent, in other words, the terminal device may receive a reference signal in a resource set that is used for interference measurement and that is indicated in the second report configuration.

Optionally, a periodicity of the X reference signals indicated by the first resource configuration is less than a periodicity of the Q reference signals indicated by the second resource.

In the foregoing method, overheads can be further reduced, and a reporting delay can be shortened.

For example, L1-SINR=S/I, where a signal item S may be directly obtained from previously reported L1-RSRP by using the foregoing association relationship, and an interference item may be obtained by measuring an interference resource IMR indicated by the second report configuration Report Config ID Y.

In other words, optionally, in this embodiment, the terminal device may first receive the first report configuration information sent by the network device; based on the first report configuration information, the terminal device may receive the X reference signals, measure the third channel quality information (for example, L1-RSRP) of the X reference signals, and report the third channel quality information of the Y reference signals of relatively good channel quality to the network device; and then the terminal device may receive the second report configuration information sent by the network device, and the terminal device may send the fourth channel quality information (for example, L1-SINRs) of the P reference signals based on the second report configuration information.

Optionally, the first report configuration information and the second report configuration information may be one or more pieces of configuration information sent by the network device.

Optionally, the network device may configure at least two report configurations (Report config). The at least two report configurations have the following features: In the at least two pieces of report configuration information, a report quantity (reportQuantity) is configured as L1-RSRP in at least one report config (collectively referred to as report config a1), and a report quantity (reportQuantity) is configured as an L1-SINR in at least one report config (collectively referred to as report config a2).

Optionally, in the at least two pieces of report configuration information, a report quantity includes at least one resource configuration (collectively referred to as resource config b1) associated with or included in report config (report configuration) of the L1-RSRP, and the at least one resource config includes or indicates at least one reference signal resource set. Optionally, the at least one reference signal resource set is a resource set (for example, a CMR RS set 1) used for channel measurement.

Optionally, in the at least two report configurations, a report quantity includes at least one resource configuration (collectively referred to as resource config b2) associated with or included in the report config of the L1-SINR, and the at least one resource config includes or indicates at least one reference signal resource set. Optionally, at least one resource set (for example, a CMR RS set 2) used for channel measurement and at least one resource set (an IMR RS set 3) used for interference measurement are included. Optionally, at least one resource set (such as an RS set 2, or an RS set 2 and an RS set 3) used for channel measurement is included.

In this embodiment, the second report configuration and the first report configuration meet an association relationship, in other words, the terminal device may receive the X reference signals, select the Y better reference signals by measuring the L1-RSRP of the X reference signals and report the Y better reference signals to the network device, and then report the channel quality information of the P reference signals based on the L1-RSRP of the Y reference signals. For example, the L1-SINR of the P reference signals is reported based on the L1-RSRP of the Y reference signals, to determine a better reference signal. The association relationship of the two report configurations is established, so that resource overheads can be effectively reduced, reporting overheads can be reduced, and computational complexity can be reduced.

It should be understood that, sequence numbers of the foregoing processes do not mean execution sequences. The execution sequences of the processes should be determined based on functions and internal logic of the processes and should not be construed as any limitation on the implementation processes of the embodiments.

The channel state information transmission method according to the embodiments is described in detail above. The terminal device recommends a preferred transmission manner for data transmission, so that the network device obtains accurate channel state information, thereby improving accuracy of the channel state information reported by the terminal device. It should be understood that the terminal device and the network device in the embodiments may perform the foregoing methods in the embodiments. In other words, for a specific working process of the following products, refer to a corresponding process in the foregoing method embodiments.

The following describes in detail a channel state information transmission apparatus with reference to FIG. 8 to FIG. 11.

Figure 8:
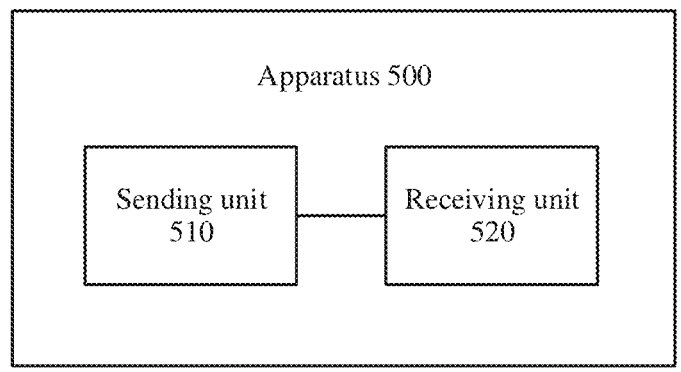
FIG. 8 is a schematic structural diagram of a channel state information transmission apparatus according to an embodiment.

FIG. 8 is a schematic block diagram of a channel state information transmission apparatus according to an embodiment. As shown in FIG. 8, the apparatus 500 may include a sending unit 510 and a receiving unit 520.

In a possible implementation, the apparatus 500 may correspond to the terminal device in the foregoing method embodiments, for example, may be the terminal device, or may be a chip disposed in the terminal device. The apparatus 500 can perform the steps performed by the terminal device in FIG. 2.

The receiving unit 520 is configured to receive N reference signal groups, where N is an integer greater than or equal to 2.

The sending unit 510 is configured to send channel state information, where the channel state information includes a first resource index, a second resource index, and first channel quality information, the first resource index is a resource index of a first reference signal, the second resource index is a resource index of a second reference signal, the first reference signal and the second reference signal are reference signals in different groups in the N reference signal groups, and the first channel quality information is obtained by using the first reference signal as a signal and the second reference signal as interference.

It should be understood that the apparatus 500 may further include a processing unit, and the processing unit may be configured to control the receiving unit 520 and the sending unit 510 to perform related steps.

In this embodiment, the terminal device may determine, based on a receiving status of the N reference signal groups, a reference signal used as a signal item and a reference signal used as an interference item, thereby avoiding a problem that when a network device configures an interference resource, because the network device cannot learn of a receiving status of the terminal device, the network device configures a non-interference beam as the interference resource, and consequently channel state information reported by the terminal device is inaccurate. The terminal device may report a resource index of the reference signal used as the signal item, a resource index of the reference signal used as the interference item, and measured channel quality information, so that accuracy of the channel state information reported by the terminal device can be improved.

Optionally, the processing unit is configured to determine first reference signals in the N reference signal groups. The processing unit is further configured to determine second reference signals in the N reference signal groups based on the first reference signals.

Optionally, the receiving unit 520 is further configured to receive first configuration information, where the first configuration information indicates that the N reference signal groups are channel measurement reference signal groups.

The sending unit 510 is further configured to send second channel quality information, where the second channel quality information is obtained by using the second reference signal as a signal and the first reference information as interference.

Optionally, the sending unit 510 is further configured to send first identifier information and/or second identifier information, where the first identifier information is used to indicate an identifier of a reference signal group in which the first reference signal is located, and the second identifier information is used to indicate an identifier of a reference signal group in which the second reference signal is located.

Optionally, the receiving unit 520 is further configured to receive second configuration information, where the second configuration information indicates that the N reference signal groups include M channel measurement reference signal groups and N-M interference measurement reference signal groups, and M is a positive integer less than N.

The processing unit is configured to determine the first reference signal in the M reference signal groups.

The processing unit is further configured to determine the second reference signal in the N-M reference signal groups based on the first reference signal.

Optionally, the sending unit 210510 is further configured to send third identifier information, where the third identifier information is used to indicate an identifier of a reference signal group in which the second reference signal is located.

In a possible implementation, the apparatus 500 may correspond to the terminal device in the foregoing method embodiments, for example, may be the terminal device, or may be a chip disposed in the terminal device. The apparatus 500 can perform the steps performed by the terminal device in FIG. 6.

The receiving unit 520 is configured to receive X reference signal.

The sending unit 510 is configured to send third channel quality information of Y reference signals in the X reference signals, where X and Y are positive integers, and Y is less than or equal to X.

The sending unit 510 is further configured to send fourth channel quality information of P reference signals, where the fourth channel quality information of the P reference signals is obtained based on the third channel quality information of the Y reference signals, and P is a positive integer.

It should be understood that the apparatus 500 may further include a processing unit, and the processing unit may be configured to control the receiving unit 520 and the sending unit 510 to perform related steps.

In this embodiment, the terminal device may receive the X reference signals, select Y better reference signals by measuring third channel quality information of the X reference signals and report the Y better reference signals to a network device, and then report the fourth channel quality information of the P reference signals based on the third channel quality information of the Y reference signals, to determine a better reference signal. In this embodiment, resource overheads can be effectively reduced, reporting overheads can be reduced, and computational complexity can be reduced.

Optionally, the receiving unit 520 is further configured to receive first report configuration information, where the first report configuration information indicates a first resource configuration and a first report quantity, the first resource configuration indicates resources of the X reference signals, and the first report quantity indicates a type of the third channel quality information.

Optionally, the receiving unit 520 is further configured to receive second report configuration information, where the second report configuration information indicates a second resource configuration and a second report quantity, the second resource configuration indicates resources of L reference signals and resources of Q third reference signals, the L reference signals are reference signals used for channel measurement, the third reference signals are reference signals used for interference measurement, the second report quantity indicates a type of the fourth channel quality information, the P reference signals are a subset of the L reference signals, and L and Q are positive integers.

Optionally, the P reference signals are a subset of the Y reference signals.

Optionally, the receiving unit 520 is further configured to receive the Q third reference signals.

Optionally, the second report configuration information and the first report configuration information meet a first association relationship, and/or the second resource configuration and the first resource configuration meet a second association relationship.

Optionally, the first association relationship is that the second report configuration information includes identification information indicating the first report configuration information.

Optionally, the second association relationship is one of the following relationships:

A transmission time interval between the L reference signals and/or the Q third reference signals and the X reference signals is less than a preset threshold;

the L reference signals and/or the Q third reference signals and the X reference signals meet a quasi co-site/quasi co-location QCL relationship; or the resources of the L reference signals and/or the resources of the Q third reference signals are subsets of the resources of the X reference signals.

Optionally, the fourth channel quality information is any one of the following: a signal to interference plus noise ratio, a signal-to-noise ratio, a channel quality indicator, and reference signal received quality.

It should be understood that the apparatus 500 according to this embodiment may correspond to the method performed by the terminal device in the foregoing method embodiments. In addition, the foregoing and other management operations and/or functions of the units/modules in the apparatus 500 are separately used to implement corresponding steps of the method performed by the first terminal device in the foregoing method embodiments, and therefore, can also achieve the beneficial effects in the foregoing method embodiments. For brevity, details are not described herein again.

It should be further understood that the units/modules in the apparatus 500 may be implemented in a form of software and/or hardware. This is not limited. In other words, the apparatus 500 is presented in a form of functional modules. The "unit" herein may be an application specific integrated circuit (ASIC), a circuit, a processor and a memory that execute one or more software or firmware programs, an integrated logic circuit, and/or another component that can provide the foregoing functions.

The apparatus 500 in the foregoing solutions may have a function of implementing corresponding steps performed by the terminal device in the foregoing methods. The function may be implemented by hardware, or may be implemented by hardware executing corresponding software. The hardware or the software includes one or more modules corresponding to the foregoing function. For example, the sending unit may be replaced with a transmitter, the receiving unit may be replaced with a receiver, and another unit such as a determining unit may be replaced with a processor, to respectively perform a sending operation, a receiving operation, and a related processing operation in the method embodiments.

In this embodiment, the apparatus in FIG. 8 may alternatively be a chip or a chip system, for example, a system on chip (SoC). Correspondingly, the receiving unit and the sending unit may be a transceiver circuit of the chip. This is not limited herein.

Figure 9:
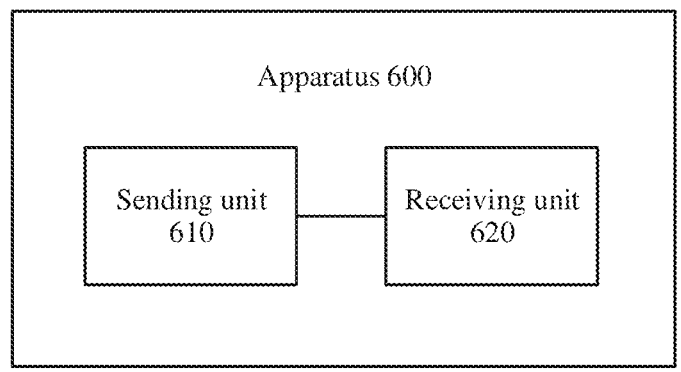
FIG. 9 is a schematic structural diagram of a channel state information transmission apparatus according to another embodiment.

FIG. 9 is a schematic block diagram of a channel state information transmission apparatus according to an embodiment. As shown in FIG. 9, the apparatus 600 may include a sending unit 610 and a receiving unit 620.

In a possible implementation, the apparatus 600 may correspond to the network device in the foregoing method embodiments, for example, may be the network device, or may be a chip disposed in the network device. The apparatus 600 can perform the steps performed by the network device in FIG. 2.

The sending unit 610 is configured to send N reference signal groups, where N is an integer greater than or equal to 2.

The receiving unit 620 is configured to receive channel state information, where the channel state information includes a first resource index, a second resource index, and first channel quality information, the first resource index is a resource index of a first reference signal, the second resource index is a resource index of a second reference signal, the first reference signal and the second reference signal are reference signals in different groups in the N reference signal groups, and the first channel quality information is obtained by using the first reference signal as a signal and the second reference signal as interference.

It should be understood that the apparatus 600 may further include a processing unit, and the processing unit may be configured to control the receiving unit 620 and the sending unit 610 to perform related steps.

In this embodiment, the network device may receive the first resource index, the second resource index, and the first channel quality information that are sent by a terminal device. The terminal device may determine, based on a receiving status of the N reference signal groups, a reference signal used as a signal item and a reference signal used as an interference item, thereby avoiding a problem that when the network device configures an interference resource, because the network device cannot learn of a receiving status of the terminal device, the network device configures a non-interference beam as the interference resource, and consequently channel state information reported by the terminal device is inaccurate. The terminal device may report a resource index of the reference signal used as the signal item, a resource index of the reference signal used as the interference item, and measured channel quality information, so that accuracy of the channel state information reported by the terminal device can be improved.

Optionally, the sending unit 610 is further configured to send first configuration information, where the first configuration information indicates that the N reference signal groups are channel measurement reference signal groups.

The receiving unit 620 is further configured to receive second channel quality information, where the second channel quality information is obtained by using the second reference signal as a signal and the first reference information as interference.

Optionally, the receiving unit 620 is further configured to receive first identifier information and/or second identifier information, where the first identifier information is used to indicate an identifier of a reference signal group in which the first reference signal is located, and the second identifier information is used to indicate an identifier of a reference signal group in which the second reference signal is located.

Optionally, the sending unit 610 is further configured to send second configuration information, where the second configuration information indicates that the N reference signal groups include M channel measurement reference signal groups and N-M interference measurement reference signal groups, and M is a positive integer less than N.

Optionally, the receiving unit 620 is further configured to receive third identifier information, where the third identifier information is used to indicate an identifier of a reference signal group in which the second reference signal is located.

In a possible implementation, the apparatus 600 may correspond to the network device in the foregoing method embodiments, for example, may be the network device, or may be a chip disposed in the network device. The apparatus 600 can perform the steps performed by the network device in FIG. 6.

The sending unit 610 is configured to send X reference signals.

The receiving unit 620 is configured to receive third channel quality information of Y reference signals in the X reference signals, where X and Y are positive integers, and Y is less than or equal to X.

The receiving unit 620 is further configured to receive fourth channel quality information of P reference signals, where the fourth channel quality information of the P reference signals is obtained based on the third channel quality information of the Y reference signals, and P is a positive integer.

It should be understood that the apparatus 600 may further include a processing unit, and the processing unit may be configured to control the receiving unit 620 and the sending unit 610 to perform related steps.

In this embodiment, the network device may send the X reference signals to a terminal device, and the terminal device selects Y better reference signals by measuring third channel quality information of the X reference signals and report the Y better reference signals to the network device, and then reports the fourth channel quality information of the P reference signals based on the third channel quality information of the Y reference signals, to determine a better reference signal. In this embodiment, resource overheads can be effectively reduced, reporting overheads can be reduced, and computational complexity can be reduced.

Optionally, the sending unit 610 is further configured to send first report configuration information, where the first report configuration information indicates a first resource configuration and a first report quantity, the first resource configuration indicates resources of the X reference signals, and the first report quantity indicates a type of the third channel quality information.

Optionally, the sending unit 610 is further configured to send second report configuration information, where the second report configuration information indicates a second resource configuration and a second report quantity, the second resource configuration indicates resources of L reference signals and resources of Q third reference signals, the L reference signals are reference signals used for channel measurement, the third reference signals are reference signals used for interference measurement, the second report quantity indicates a type of the fourth channel quality information, the P reference signals are a subset of the L reference signals, and L and Q are positive integers.

Optionally, the P reference signals are a subset of the Y reference signals.

Optionally, the sending unit 610 is further configured to send the Q third reference signals.

Optionally, the second report configuration information and the first report configuration information meet a first association relationship, and/or the second resource configuration and the first resource configuration meet a second association relationship.

Optionally, the first association relationship is that the second report configuration information includes identification information indicating the first report configuration information.

Optionally, the second association relationship is one of the following relationships:

A transmission time interval between the L reference signals and/or the Q third reference signals and the X reference signals is less than a preset threshold;

the L reference signals and/or the Q third reference signals and the X reference signals meet a quasi co-site/quasi co-location QCL relationship; or the resources of the L reference signals and/or the resources of the Q third reference signals are subsets of the resources of the X reference signals.

Optionally, the fourth channel quality information is any one of the following: a signal to interference plus noise ratio, a signal-to-noise ratio, a channel quality indicator, and reference signal received quality.

It should be understood that the apparatus 600 according to this embodiment may correspond to the method performed by the network device in the foregoing method embodiments. In addition, the foregoing and other management operations and/or functions of the units/modules in the apparatus 600 are separately used to implement corresponding steps of the method performed by the network device in the foregoing method embodiments, and therefore, can also achieve the beneficial effects in the foregoing method embodiments. For brevity, details are not described herein again.

It should be further understood that the units/modules in the apparatus 600 may be implemented in a form of software and/or hardware. This is not limited. In other words, the apparatus 600 is presented in a form of functional modules. The "unit" herein may be an ASIC, a circuit, a processor and a memory that execute one or more software or firmware programs, an integrated logic circuit, and/or another component that can provide the foregoing functions.

The apparatus 600 in the foregoing solutions has a function of implementing corresponding steps performed by the network device in the foregoing methods. The function may be implemented by hardware, or may be implemented by hardware executing corresponding software. The hardware or the software includes one or more modules corresponding to the foregoing function. For example, the sending unit may be replaced with a transmitter, the receiving unit may be replaced with a receiver, and another unit such as a determining unit may be replaced with a processor, to respectively perform a sending operation, a receiving operation, and a related processing operation in the method embodiments.

In this embodiment, the apparatus in FIG. 9 may alternatively be a chip or a chip system, for example, a, SoC. Correspondingly, the receiving unit and the sending unit may be a transceiver circuit of the chip. This is not limited herein.

Figure 10:
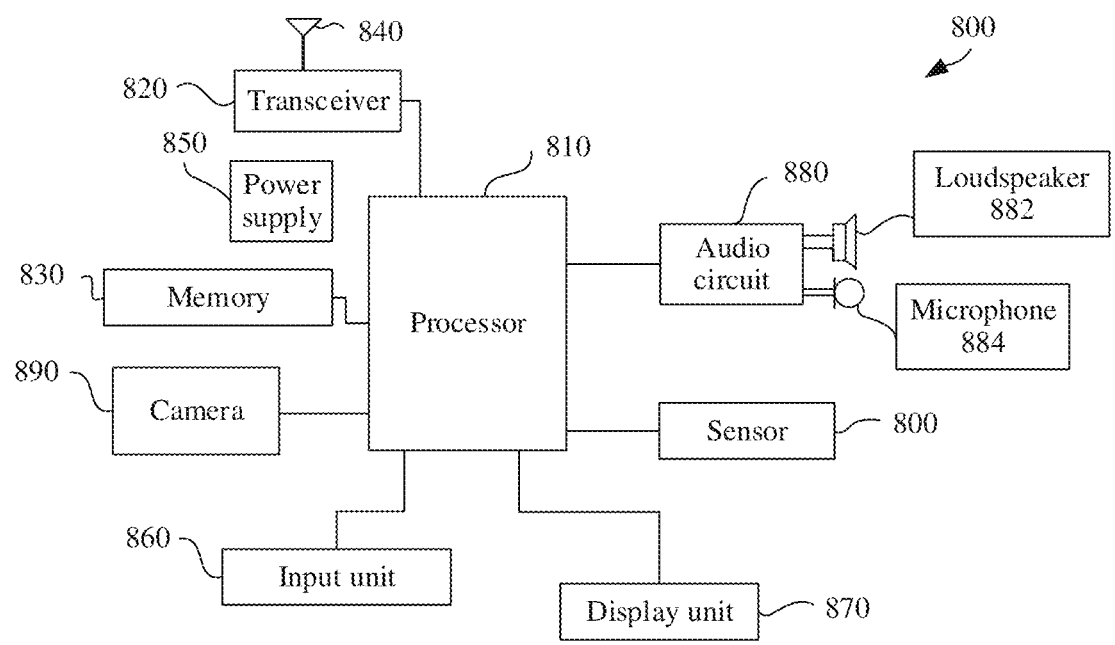
FIG. 10 is a schematic structural diagram of a channel state information transmission apparatus according to another embodiment.

FIG. 10 is a schematic structural diagram of an apparatus 800 according to an embodiment. The apparatus 800 may be a terminal device, and is applied to the system shown in FIG. 1, to perform a function of the terminal device in the foregoing method embodiments.

As shown in FIG. 10, the terminal device 800 includes a processor 810 and a transceiver 820. Optionally, the terminal device 800 further includes a memory 830. The processor 810, the transceiver 802, and the memory 830 may communicate with each other through an internal connection path, and transfer a control signal and/or a data signal. The memory 2030 is configured to store a computer program. The processor 810 is configured to: invoke the computer program from the memory 830 and run the computer program, to control the transceiver 820 to receive/send a signal. Optionally, the apparatus 800 may further include an antenna 840, configured to send, by using a radio signal, uplink data or uplink control signaling output by the transceiver 820.

The processor 810 and the memory 830 may be integrated into one processing apparatus. The processor 810 is configured to execute program code stored in the memory 830 to implement the foregoing functions. During implementation, the memory 830 may alternatively be integrated into the processor 810, or may be independent of the processor 810. The processor 810 may correspond to the processing unit in the apparatus 500.

The transceiver 820 may correspond to the receiving unit 520 and the sending unit 510 in FIG. 8, and may also be referred to as a communications unit. The transceiver 820 may include a receiver (which is also referred to as a receiver or a receiver circuit) and a transmitter (which is also referred to as a transmitter or a transmitter circuit). The receiver is configured to receive a signal, and the transmitter is configured to transmit a signal.

It should be understood that, the terminal device 800 shown in FIG. 10 can implement processes related to the terminal device in the method embodiments in FIG. 2 and FIG. 6. Operations and/or functions of the modules in the terminal device 800 are separately intended to implement corresponding procedures in the foregoing method embodiments. For details, refer to the descriptions in the foregoing method embodiments. To avoid repetition, detailed descriptions are properly omitted herein.

The processor 810 may be configured to perform an action that is implemented inside the terminal device and that is described in the foregoing method embodiments, and the transceiver 820 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 800 may further include a power supply 850, configured to supply power to various components or circuits in the terminal device.

In addition, to further improve functions of the apparatus, the apparatus 800 may further include one or more of an input unit 860, a display unit 870, an audio circuit 880, a camera 890, a sensor 810, and the like, and the audio circuit may further include a loudspeaker 882, a microphone 884, and the like.

It should be noted that the terminal device 800 may be the terminal device in any one of the foregoing method embodiments, to implement the steps or functions of the terminal device in any one of the foregoing implementations.

Figure 11:
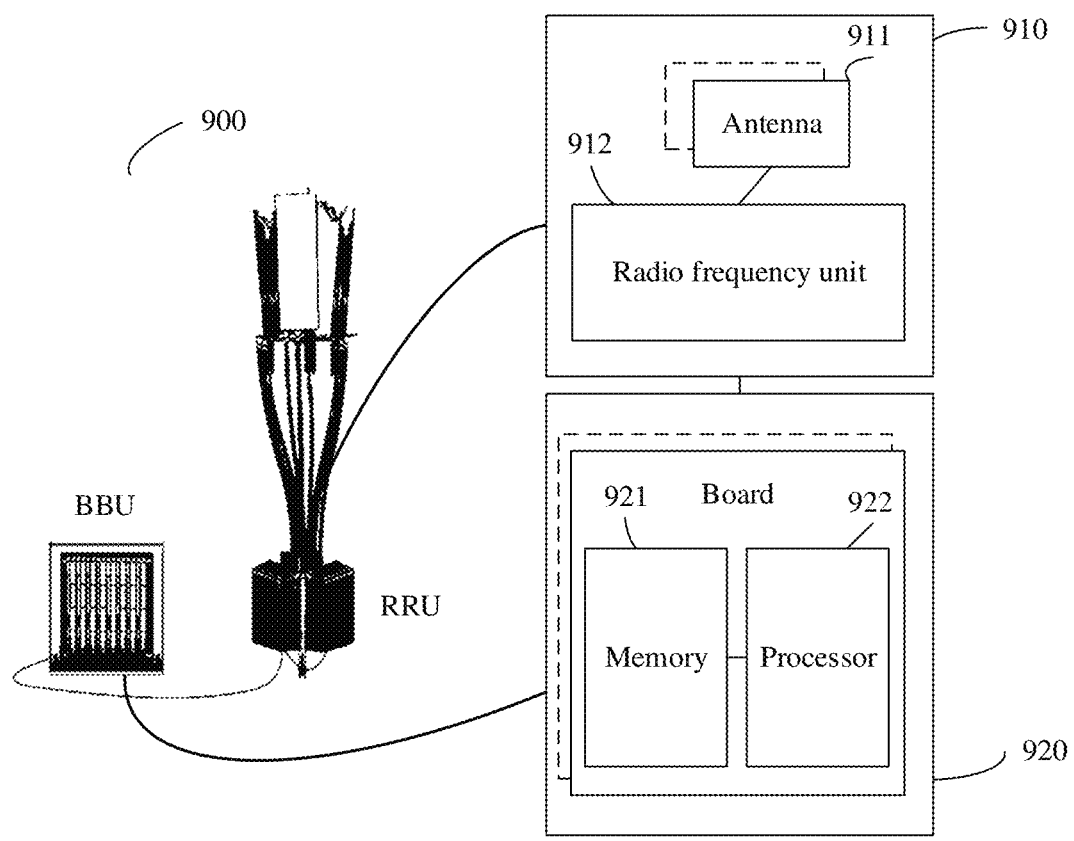
FIG. 11 is a schematic structural diagram of a channel state information transmission apparatus according to another embodiment.

FIG. 11 is a schematic structural diagram of an apparatus 900 according to an embodiment. For example, FIG. 11 may be a schematic structural diagram of a network device. The network device 900 may be applied to the system shown in FIG. 1, to perform a function of the network device in the foregoing method embodiments.

As shown in the figure, for example, the network device 900 may include one or more radio frequency units, for example, a remote radio unit (RRU) 910 and one or more baseband units (BBU) (which may also be referred to as a digital unit (DU)) 920. The RRU 910 may be referred to as a communications unit or a transceiver unit, and corresponds to the sending unit 610 and the receiving unit 620 in FIG. 9. Optionally, the transceiver unit 910 may also be referred to as a transceiver, a transceiver circuit, a transceiver, or the like, and may include at least one antenna 911 and a radio frequency unit 912.

Optionally, the transceiver unit 910 may include a receiving unit and a sending unit. The receiving unit may correspond to a receiver (which is also referred to as a receiver or a receiver circuit), and the sending unit may correspond to a transmitter (which is also referred to as a transmitter or a transmitter circuit). The RRU 910 is mainly configured to: receive/send a radio frequency signal, and perform conversion between a radio frequency signal and a baseband signal. For example, the RRU 910 is configured to send first information to a terminal device. The BBU 920 is mainly configured to: perform baseband processing, control the network device, and the like. The RRU 910 and the BBU 920 may be physically disposed together, or may be physically separated, namely, a distributed base station.

The BBU 920 is a control center of the network device, and may also be referred to as a processing unit. The BBU 920 may correspond to the processing unit included in the apparatus 600, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate the foregoing indication information.

In an example, the BBU 920 may include one or more boards, and a plurality of boards may jointly support a radio access network (for example, an LTE network) having a single access standard, or may separately support radio access networks (for example, an LTE network, a 5G network, or another network) having different access standards. The BBU 920 further includes a memory 921 and a processor 922. The memory 921 is configured to store necessary instructions and data. The processor 922 is configured to control the network device to perform a necessary action, for example, configured to control the network device to perform an operation procedure related to the network device in the foregoing method embodiments. The memory 921 and the processor 922 may serve one or more boards. In other words, a memory and a processor may be independently disposed on each board. Alternatively, a plurality of boards may share a same memory and a same processor. In addition, a necessary circuit may further be disposed on each board.

It should be understood that the network device 900 shown in FIG. 11 can implement processes related to the network device in the method embodiments in FIG. 2 and FIG. 6. Operations and/or functions of the modules in the network device 900 are separately intended to implement corresponding procedures in the foregoing method embodiments. For details, refer to the descriptions in the foregoing method embodiments. To avoid repetition, detailed descriptions are properly omitted herein.

The BBU 920 may be configured to perform an action that is implemented inside the network device and that is described in the foregoing method embodiments, and the RRU 910 may be configured to perform an action of receiving or sending that is performed by the network device from or to the terminal device and that is described in the foregoing method embodiments. For details, refer to the descriptions in the foregoing method embodiments. Details are not described herein again.

An embodiment further provides a processing apparatus including a processor and an interface. The processor is configured to perform the method in any one of the foregoing method embodiments.

It should be understood that the processing apparatus may be a chip. For example, the processing apparatus may be a field programmable gate array (FPGA), an application specific integrated circuit (ASIC), a SoC, a CPU, a network processor (NP), a digital signal processing circuit (DSP), a microcontroller unit (MCU), a programmable controller (PLD), or another integrated chip.

In an implementation process, steps in the foregoing methods can be implemented by using a hardware integrated logical circuit in the processor, or by using instructions in a form of software. The steps of the methods disclosed with reference to the embodiments may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in the embodiments may be an integrated circuit chip and have a signal processing capability. In an implementation process, steps in the foregoing method embodiments can be implemented by using a hardware integrated logical circuit in the processor, or by using instructions in a form of software. The processor may be a general-purpose processor, a DSP, an ASIC, an FPGA or another programmable logic device, a discrete gate or a transistor logic device, or a discrete hardware component. The processor may implement or perform the methods, the steps, and logical block diagrams that are disclosed in the embodiments. The general-purpose processor may be a microprocessor, or the processor may be any conventional processor or the like. Steps of the methods disclosed with reference to the embodiments may be directly executed and accomplished by using a hardware decoding processor, or may be executed and accomplished by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in this embodiment may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods include, but are not limited to, these and any memory of another proper type.

According to the methods provided in the embodiments, there is further provided a computer program product. The computer program product includes computer program code. When the computer program code is run on a computer, the computer is enabled to perform the method in the embodiment shown in FIG. 2.

According to the methods provided in the embodiments, the embodiments further provide a computer-readable medium. The computer-readable medium stores program code. When the program code is run on a computer, the computer is enabled to perform the method in the embodiment shown in FIG. 2 or FIG. 6.

According to the methods provided in the embodiments, the embodiments further provide a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

The network device and the terminal device in the foregoing apparatus embodiments exactly correspond to the network device and the terminal device in the method embodiments. A corresponding module or unit performs a corresponding step. For example, a communications unit (a transceiver) performs a receiving step or a sending step in the method embodiments, and a processing unit (a processor) may perform a step other than the sending step and the receiving step. For a function of a specific unit, refer to a corresponding method embodiment. There may be one or more processors.

In the embodiments, "at least one" means one or more, and "a plurality of" means two or more. The term "and/or" describes an association relationship between associated objects, and represents that three relationships may exist. For example, A and/or B may represent the following cases: only A exists, both A and B exist, and only B exists, where A and B may be singular or plural. The character "/" usually represents an "or" relationship between the associated objects. "At least one (piece) of the following" or a similar expression thereof means any combination of these items, including any combination of singular items (pieces) or plural items (pieces). For example, at least one (piece) of a, b, or c may indicate the following cases: a, b, c, a and b, a and c, b and c, or a, b, and c, where a, b, and c may be singular or plural.

A person of ordinary skill in the art may be aware that, in combination with the examples described in the embodiments, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the solutions. A person of ordinary skill in the art may use different methods to implement the described functions for each particular application, but it should not be considered that the implementation goes beyond the scope of the embodiments.

The terms such as "component", "module", and "system" are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may perform communication by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, various illustrative logical blocks and steps that are described with reference to the embodiments disclosed may be implemented by electronic hardware or a combination of computer software and electronic hardware. Whether the functions are performed by using hardware or software depends on particular applications and design constraint conditions of the solutions. A person of ordinary skill in the art may use different methods to implement the described functions for each particular application, but it should not be considered that the implementation goes beyond the scope. It may be clearly understood by a person of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

In the foregoing embodiments, all or some of functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in a form of a software functional unit and sold or used as an independent product, the functions may be stored in a computer-readable storage medium. Based on such an understanding, the solutions essentially, or the part contributing to the current technology, or some of the solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations, and are non-limiting. Any variation or replacement readily figured out by a person of ordinary skill in the art within the scope of the embodiments shall fall within the scope of the embodiments.

What is claimed is:

1. A channel state information transmission method, comprising:
    receiving N reference signal groups and configuration information, wherein N is an integer greater than or equal to 2, wherein the configuration information indicates that the N reference signal groups comprise M channel measurement reference signal groups and N-M interference measurement reference signal groups, and wherein M is a positive integer less than N;
    determining a first reference signal in the M reference signal groups; and
    determining a second reference signal in the N-M reference signal groups based on the first reference signal, wherein the first reference signal and the second reference signal are reference signals in different groups in the N reference signal groups; and
    sending channel state information, wherein the channel state information comprises a first resource index, a second resource index, and first channel quality information, the first resource index is a resource index of the first reference signal, the second resource index is a resource index of the second reference signal, and the first channel quality information is obtained by using the first reference signal as a signal and the second reference signal as interference.

2. The method according to claim 1, further comprising:
    determining plural first reference signals in the N reference signal groups; and
    determining plural second reference signals in the N reference signal groups based on the first reference signals.

3. The method according to claim 1, further comprising:
    sending first identifier information, wherein the first identifier information is used to indicate an identifier of a reference signal group in which the first reference signal is located.

4. The method according to claim 1, further comprising:
    sending second identifier information, wherein the second identifier information is used to indicate an identifier of a reference signal group in which the second reference signal is located.

5. The method according to claim 1, further comprising:
    sending second channel quality information, wherein the second channel quality information is obtained by using the second reference signal as a signal and the first reference signal as interference.

6. A channel state information transmission apparatus, comprising:
    a receiver configured to receive N reference signal groups and configuration information, wherein N is an integer greater than or equal to 2, and wherein the configuration information indicates that the N reference signal groups comprise M channel measurement reference signal groups and N-M interference measurement reference signal groups, and wherein M is a positive integer less than N;
    a processor configured to determine a first reference signal in the M reference signal groups and to determine a second reference signal in the N-M reference signal groups based on the first reference signal, wherein the first reference signal and the second reference signal are reference signals in different groups in the N reference signal groups; and
    a transmitter configured to send channel state information, wherein the channel state information comprises a first resource index, a second resource index, and first channel quality information, the first resource index is a resource index of the first reference signal, the second resource index is a resource index of the second reference signal, and the first channel quality information is obtained by using the first reference signal as a signal and the second reference signal as interference.

7. The apparatus according to claim 6, wherein
the processor is configured to determine plural first reference signals in the N reference signal groups; and
the processor is configured to determine plural second reference signals in the N reference signal groups based on the first reference signals.

8. The apparatus according to claim 6, wherein the transmitter is further configured to send first identifier information, wherein the first identifier information is used to indicate an identifier of a reference signal group in which the first reference signal is located.

9. The apparatus according to claim 6, wherein the transmitter is further configured to send second identifier information, wherein the second identifier information is used to indicate an identifier of a reference signal group in which the second reference signal is located.

10. The apparatus according to claim 6, wherein the transmitter is further configured to send second channel quality information, wherein the second channel quality information is obtained by using the second reference signal as a signal and the first reference signal as interference.

\* \* \* \* \*